United States Patent
Watanabe et al.

(10) Patent No.: US 10,001,672 B2
(45) Date of Patent: Jun. 19, 2018

(54) SIDE EDGE PLANAR LIGHTING UNIT

(71) Applicants: CITIZEN ELECTRONICS CO., LTD., Yamanashi-ken (JP); CITIZEN WATCH CO., LTD., Tokyo (JP)

(72) Inventors: Kiyokazu Watanabe, Yamanashi-ken (JP); Yoshihiro Sho, Yamanashi-ken (JP); Naoya Kashiwagi, Yamanashi-ken (JP); Takashi Watanabe, Yamanashi-ken (JP); Takumi Miyashita, Yamanashi-ken (JP); Toshinobu Katsumata, Yamanashi-ken (JP); Takuma Horiuchi, Yamanashi-ken (JP); Junji Miyashita, Yamanashi-ken (JP); Tomoo Udagawa, Yamanashi-ken (JP); Kazuhiro Uwajima, Yamanashi-ken (JP)

(73) Assignees: CITIZEN ELECTRONICS CO., LTD., Yamamashi-Ken (JP); CITIZEN WATCH CO., LTD., Tokyo (JP)

( * ) Notice: Subject to any disclaimer, the term of this patent is extended or adjusted under 35 U.S.C. 154(b) by 0 days. days.

(21) Appl. No.: 15/794,433

(22) Filed: Oct. 26, 2017

(65) Prior Publication Data

US 2018/0120643 A1 May 3, 2018

(30) Foreign Application Priority Data

Oct. 28, 2016 (JP) .................................. 2016-212316
Dec. 12, 2016 (JP) .................................. 2016-240745
Dec. 16, 2016 (JP) .................................. 2016-243940

(51) Int. Cl.
*G02F 1/1335* (2006.01)
*F21S 2/00* (2016.01)
(Continued)

(52) U.S. Cl.
CPC ........ *G02F 1/133615* (2013.01); *F21S 2/005* (2013.01); *G02B 6/0031* (2013.01);
(Continued)

(58) Field of Classification Search
CPC .......................... G02F 1/133615; G02F 6/0023
(Continued)

(56) References Cited

U.S. PATENT DOCUMENTS 7,139,048 B2 * 11/2006 Han ...................... G02B 6/0018
349/62
7,637,646 B2 * 12/2009 Byun ................... G02B 6/0016
349/65
(Continued)

FOREIGN PATENT DOCUMENTS

JP     2007-103101     4/2007

*Primary Examiner* — Laura Tso
(74) *Attorney, Agent, or Firm* — Wenderoth, Lind & Ponack, L.L.P.

(57) ABSTRACT

A side edge planar lighting unit includes a light emitting diode, a light guide plate, and a transparent flexible resin between the light emitting diode and the light guide plate. The light emitting diode and the light guide plate are brought into close contact by the transparent flexible resin. The light guide plate includes a light exit face on a first main surface, a reflective face on a side opposite the light exit face, and a recessed portion in a first side edge. The recessed portion includes the light entrance face on a bottom surface, a pair of light entrance side faces facing each other across the light entrance face, and an anti-slip portion made of an uneven structure on at least one of the light entrance side faces. The transparent flexible resin is fitted in the recessed portion of the light guide plate.

13 Claims, 37 Drawing Sheets

(51) Int. Cl.
*F21V 8/00* (2006.01)
*G02F 1/03* (2006.01)
*G02F 1/1337* (2006.01)

(52) U.S. Cl.
CPC ......... *G02B 6/0073* (2013.01); *G02F 1/0316* (2013.01); *G02F 2001/133746* (2013.01)

(58) Field of Classification Search
USPC ........................................ 362/612, 622, 621
See application file for complete search history.

(56) References Cited

U.S. PATENT DOCUMENTS

| | | | | |
|---|---|---|---|---|
| 8,337,066 B2* | 12/2012 | Yeh | ...................... | G02B 6/0021 |
| | | | | 362/612 |
| 8,511,879 B2* | 8/2013 | Im | ...................... | G02B 6/0091 |
| | | | | 349/65 |
| 8,622,601 B2* | 1/2014 | Zheng | .................. | G02B 6/0021 |
| | | | | 362/612 |
| 8,646,962 B2* | 2/2014 | Isobe | .................. | G02B 6/0021 |
| | | | | 362/602 |
| 9,874,673 B2* | 1/2018 | Zhu | ...................... | G02B 6/0021 |
| 2007/0008739 A1* | 1/2007 | Kim | ...................... | G02B 6/0021 |
| | | | | 362/612 |

* cited by examiner

SIDE EDGE PLANAR LIGHTING UNIT

CROSS-REFERENCE TO RELATED APPLICATION

The present application is based on, and claims priorities from Japanese patent applications No. 2016-212316 filed on Oct. 28, 2016, No. 2016-240745 filed on Dec. 12, 2016 and No. 2016-243940 filed on Dec. 16, 2016, the disclosures of which are hereby incorporated by reference herein in its entirety.

BACKGROUND

Technical Field

The present application relates to planar lighting units and, in particular, to a side edge planar lighting unit for which luminous efficiency is improved by interposing transparent flexible resin between a light source and a light entrance face of a light guide plate.

Discussion of the Background

Conventionally, side edge planar lighting units including light guide plates have been used as backlights in liquid crystal display devices. In such planar lighting units, light enters the light guide plate through a side face (light entrance face) and exits through a main face (light exit face). Some planar lighting units are designed such that an air layer is not present between the light source and the light guide plate in order to improve luminous efficiency. For example, Japanese Unexamined Patent Application Publication No. 2007-103101 (see FIG. 1) recites a planar lighting unit including a light source, a light guide plate, and an intermediate layer between the light source and the light guide plate, the intermediate layer being in close contact with both the light source and the light guide plate.

In general, optical characteristics such as luminous efficiency and brightness uniformity must be maintained in side edge planar lighting units. As such, constant efforts have been made to suppress positional deviation between the LEDs and the light guide plate. In particular, when an intermediate layer is interposed between the LEDs and the light guide plate, positional deviation of this intermediate layer can cause prominent degradations in optical characteristics. Examples of such degradations include reductions in luminous efficiency and uneven brightness. As such, for planar lighting units including intermediate layers, precise and careful work is required to ensure that positional deviation between the intermediate layer and the light guide plate does not occur when installing the LEDs, the intermediate layer, and the light guide plate in a case.

With the planar lighting unit recited in Japanese Unexamined Patent Application Publication No. 2007-103101, transparent resin is disposed between the LEDs serving as the light source and the light entrance face of the light guide plate. However, in this case, the inventors have recognized that positional deviation may occur between the intermediate layer and the light guide plate when installing the LEDs, the intermediate layer, and the light guide plate in the case. In turn, this positional deviation may lead to the intermediate layer being incorrectly disposed between the LEDs and the light guide plate. In order to solve this problem, the inventors used designed prototypes and experimented with the assembly of a planar lighting unit. In the experiments, the inventors formed a recessed portion in the light entrance face of the light guide plate and fit an intermediate layer, namely transparent flexible resin, into the recessed portion.

In the experiments, the inventors were able to positionally stabilize the transparent flexible resin in the recessed portion of the light guide plate but, when installing the LED, the transparent flexible resin, and the light guide plate in the case, found that the transparent flexible resin easily fell out of the recessed portion of light guide plate and that assembly workability was poor.

In light of the problems described above, an object of the present application is to provide a planar lighting unit that can be easily assembled without the transparent flexible resin becoming displaced from or falling out of the light guide plate when installing the LEDs, the transparent flexible resin, and the light guide plate in the case, even in cases where the transparent flexible resin is interposed between the LEDs and the light entrance face of the light guide plate, and the LEDs and light entrance face of the light guide plate are brought into close contact with the transparent flexible resin.

The planar lighting unit of the present application utilizes the following configurations to solve the problem described above.

SUMMARY

According to a one aspect of the present disclosure, a planar lighting unit includes a light emitting diode, a light guide plate, and a transparent flexible resin between the light emitting diode and the light guide plate. The light emitting diode and a light entrance face of the light guide plate closely contact the transparent flexible resin. The light guide plate includes a light exit face on a first main surface, a reflective face positioned on a side opposite the light exit face, and a recessed portion in a first side edge. The recessed portion includes the light entrance face on a bottom surface, a pair of light entrance side faces facing each other across the light entrance face, and an anti-slip portion made of an uneven structure on at least one of the light entrance side faces. The transparent flexible resin is fitted into the recessed portion of the light guide plate.

In the one aspect of the present disclosure, the anti-slip portion made of the uneven structure may include a ridge line along a fitting direction of the transparent flexible resin.

In the one aspect of the present disclosure, the anti-slip portion made of the uneven structure may include a ridge line in a direction orthogonal to a fitting direction of the transparent flexible resin.

In the one aspect of the present disclosure, the anti-slip portion made of the uneven structure may include a plurality of dots.

In the one aspect of the present disclosure, a cross-sectional shape of the recessed portion may gradually widen from the bottom surface toward a top edge of the recessed portion, and a distance between the pair of light entrance side faces facing each other may be greater at the top edge of the recessed portion than at the bottom surface of the recessed portion.

In the one aspect of the present disclosure, the light guide plate may include a reflective curved surface extending from the first side edge toward the light exit face of the light guide plate. Alternately, the transparent flexible resin may include a reflective curved surface extending from the light emitting diode toward the light entrance face of the light guide plate.

In the one aspect of the present disclosure, the light guide plate may include a pair of supports, one of the pair of supports being disposed on each side of the first side edge, and a fixing member, fixing the light guide plate to a case in which the light guide plate is housed, disposed on a tip of each of the pair of supports.

The planar lighting unit according to the embodiments of present application includes the recessed portion in the first side surface of the light guide plate. The transparent flexible resin is fitted into the recessed portion. The bottom surface of the recessed portion is the light entrance face and the anti-slip portion having the uneven structure is disposed on at least one of the light entrance side faces facing each other across the light entrance face. The configuration including this anti-slip portion increases the contact area between the light guide plate and the transparent flexible resin, which leads to an increase in adhesion. As a result, the transparent flexible resin does not become displaced from or fall out of the recessed portion of the light guide plate during assembly. With the planar lighting unit according to the embodiments of the present application, the planar lighting unit can be easily assembled without the transparent flexible resin becoming displaced or falling out of the light guide plate when installing the LEDs and the light guide plate in the case, even in situations where the transparent flexible resin is interposed between the LEDs and the light entrance face of the light guide plate.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
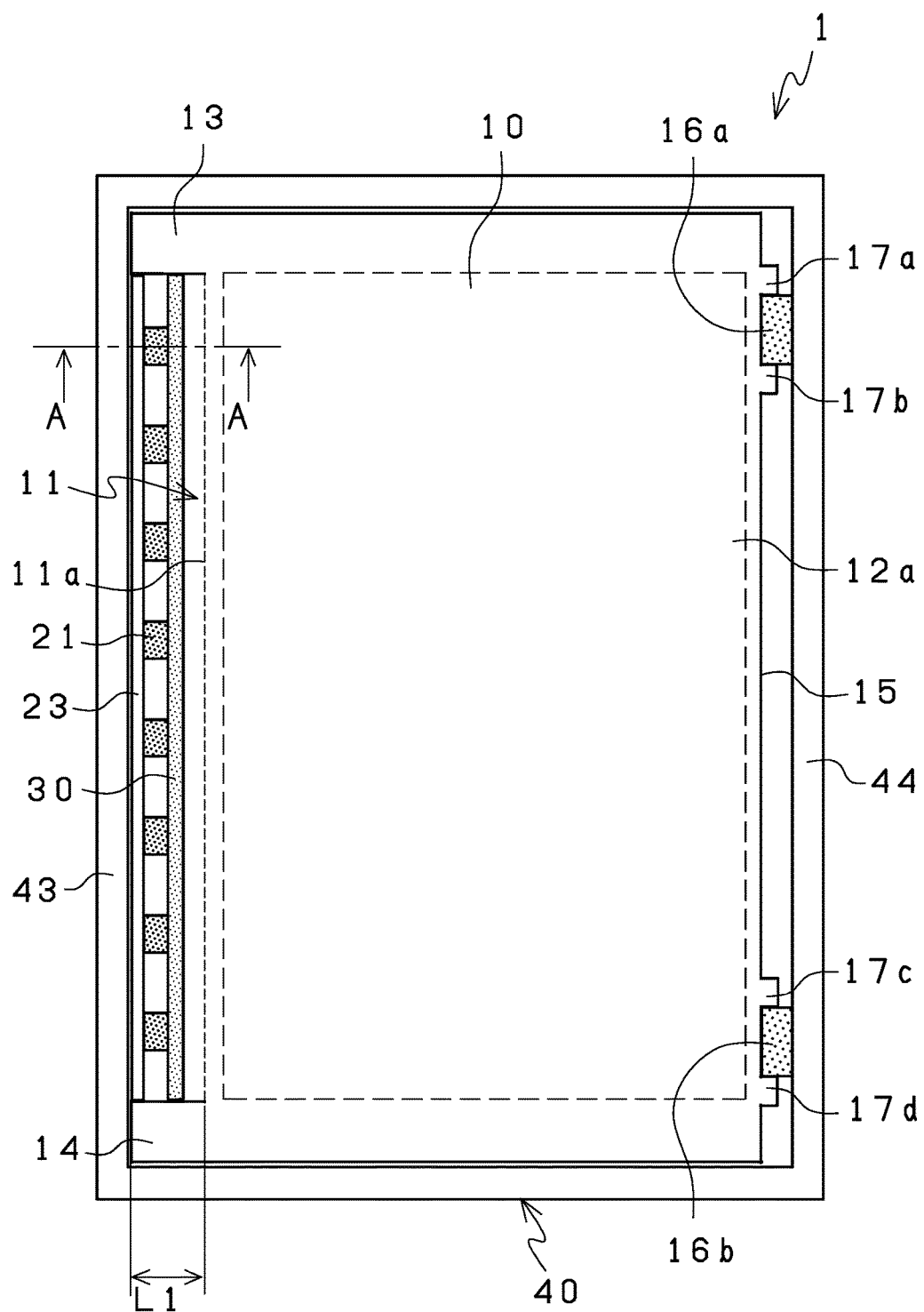
FIG. 1 is a plan view of a planar lighting unit according to a first embodiment of the present application.

Hereinafter, embodiments of the present application will be described in detail with reference to the attached drawings. In the drawings, identical or corresponding constituents are identified using the same reference numerals, and redundant description is omitted. In the drawings, scale is appropriately changed to facilitate description, and some of the drawings are schematically illustrated to facilitate understanding of the structure.

First Embodiment

A configuration of a planar lighting unit 1 according to a first embodiment of the present application will be described with reference to FIG. 1. The planar lighting unit 1 is a so-called side edge planar lighting unit. The planar lighting unit 1 includes a light guide plate 10, a board 23 on which a plurality of light emitting diodes (hereafter referred to as "LEDs") 21 are mounted, a transparent flexible resin (hereafter referred to as "elastomer") 30 between the LEDs 21 and the light guide plate 10, and a case that houses the light guide plate 10, the LEDs 21, the board 23, and the elastomer 30. In this embodiment, the case is made of a rear frame 40. Note that the planar lighting unit 1 also includes a front frame 60 disposed over the rear frame 40 and an optical sheet 62 (see FIG. 9), but these constituents are not illustrated in FIG. 1.

The light guide plate 10 has a flat shape and, for example, is made from polycarbonate, acrylic, or the like with a thickness of 2.0 to 3.0 mm. An elongated recessed portion 11 is disposed in one side edge of the light guide plate 10. A light entrance face 11a (indicated by the vertical dashed line) is disposed on the bottom surface of the recessed portion 11. Details of the configuration of the recessed portion 11 will be discussed later with reference to FIG. 2. A light exit face 12a (surrounded by the rectangular dashed box) is disposed on one main surface of the light guide plate 10. The light guide plate 10 also includes supports 13 and 14. The supports 13 and 14 are respectively disposed on each side (top and bottom in the drawing) of the recessed portion 11. The supports 13 and 14 protrude from the light exit face 12a side, parallel with the light exit face 12a. The length that the supports 13 and 14 protrude from the light entrance face 11a is defined as protruding length L1.

The board 23 is a flexible printed circuit (FPC) with a polyimide base and has a thin, strip-like shape. The plurality of LEDs 21 are mounted longitudinally on the board 23 at a predetermined spacing. Additionally, electrodes (not illustrated) are disposed on the board 23 to supply power to the LEDs 21. The LEDs 21 are packages including blue LED chips covered with fluorescent resin.

The elastomer 30 is made from highly flexible silicone resin and has a strip-like shape and is fitted into the recessed portion 11 of the light guide plate 10. The plurality of LEDs 21 closely contact the light guide plate 10, both optically and mechanically, via the elastomer 30.

The rear frame 40 is a frame with a bottom plate and can be fabricated from aluminum. The rear frame 40 has side walls erected on the four edges of the bottom plate, and houses the LEDs 21 and the light guide plate 10. The supports 13 and 14 of the light guide plate 10 abut against a first side wall 43 (the left side in FIG. 1) of the rear frame 40. The board 23 is fixed to the inside of the first side wall 43 of the rear frame 40 by heat transfer tape (double-sided tape, not illustrated) or the like.

Two elastic members 16a and 16b are disposed in a gap between the back surface 15, which is positioned on the side opposite the light entrance face 11a, of the light guide plate 10 and a second side wall 44 (the right side in FIG. 1) of the rear frame 40. A plurality of protrusions 17a to 17d are disposed on portions of the back surface 15 of the light guide plate 10 to prevent lateral displacement of the elastic members 16a and 16b. The protrusions 17a and 17b form a pair and hold the elastic member 16a. The protrusions 17c and 17d form a pair and hold the elastic member 16b. Note that the configuration of the planar lighting unit 1 illustrated in FIG. 1 also applies to the other embodiments described herein.

Next, the recessed portion 11 and surrounding areas of the light guide plate 10 will be described in detail with reference to FIG. 2. FIG. 2 is a cross-sectional view of the planar lighting unit 1, taken along line A-A' of FIG. 1. As illustrated in FIG. 2, the recessed portion 11 of the light guide plate 10 includes the light entrance face 11a on the bottom surface and light entrance side faces 11b and 11c (indicated by dashed lines) facing each other across the light entrance face 11a. Anti-slip portions 51 and 52 having uneven structures are respectively disposed on the light entrance side faces 11b and 11c. However, a configuration is possible in which the anti-slip portions 51 or 52 is disposed on only one of the light entrance side faces 11b and 11c. Details of the configuration of the anti-slip portions 51 and 52 will be discussed later with reference to FIG. 3.

As illustrated in FIG. 2, the recessed portion 11 has a cross-sectional shape that widens from the bottom surface toward the top edge of the recessed portion 11. That is, the distance between the light entrance side faces 11b and 11c facing each other is greater at the top edge (the left side) of the recessed portion 11 than at the bottom surface (right side) of the recessed portion 11.

The light guide plate 10 has the light exit face 12a on the main surface and a reflective face 12b on the side opposite the light exit face 12a. A reflective sheet 18 is disposed on the bottom surface side of the reflective face 12b. The reflective sheet 18 is made from resin and reflects light that has leaked from the light guide plate 10 toward the light exit face 12a.

A reflective curved surface 19a having a cross-sectional bowl shape is disposed between the light exit face 12a and the recessed portion 11 of the light guide plate 10. Likewise, a reflective curved surface 19b having a cross-sectional bowl shape is disposed between the reflective face 12b and the recessed portion 11 of the light guide plate 10.

The board 23 on which the LEDs 21 are mounted is positioned and fixed to the first side wall 43 of the rear frame 40 by heat transfer tape (not illustrated).

The elastomer 30 is flexible and, as such, compresses to match the shape of the recessed portion 11 when fitted into the recessed portion 11. The light entrance face 11a of the light guide plate 10 closely contacts one surface (the right side) of the elastomer 30. The LEDs 21 closely contact the other surface (the left side) of the elastomer 30. Refractive indexes of the fluorescent resin of the LEDs 21, the elastomer 30, and the light guide plate 10 are approximately 1.5. Thus, an air layer is not present between the LEDs 21 and the light entrance face 11a of the light guide plate 10. Instead, the LEDs 21 and the light entrance face 11a of the light guide plate 10 closely contact each other, both mechanically and optically, via the elastomer 30.

Figure 3A:
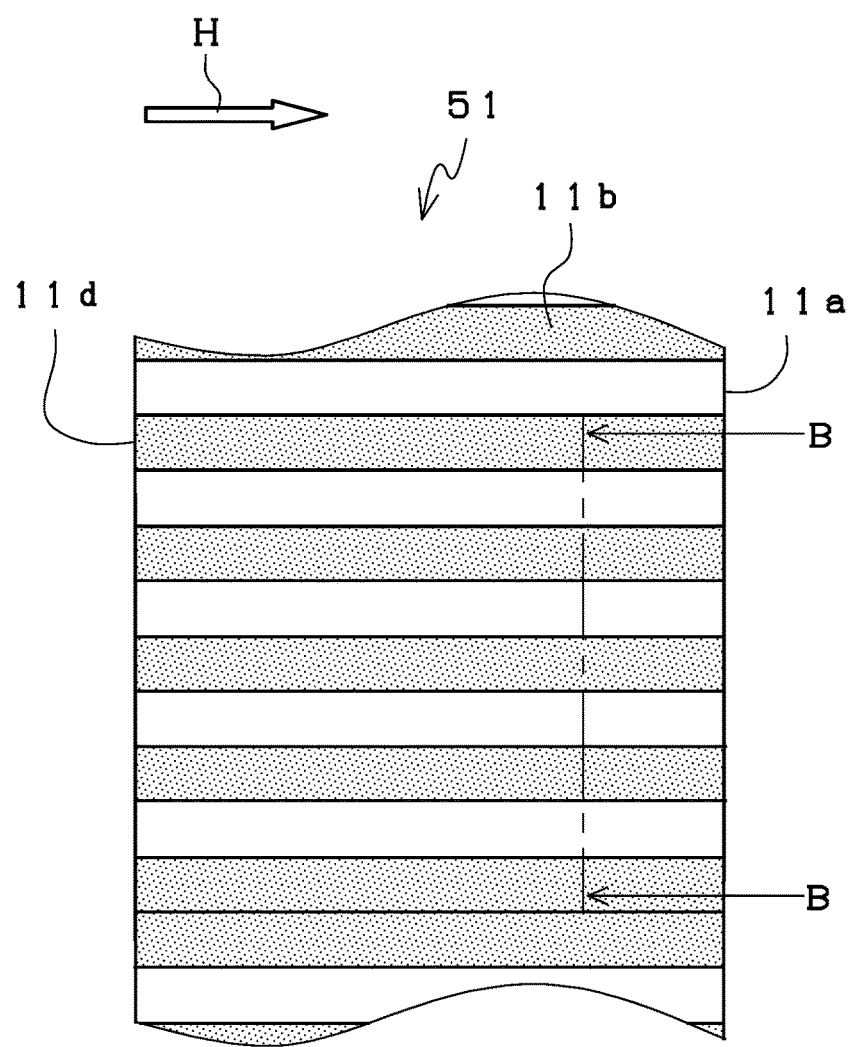
FIG. 3A is a partial plan view of an anti-slip portion of the planar lighting unit according to the first embodiment of the present application.
Figure 3B:
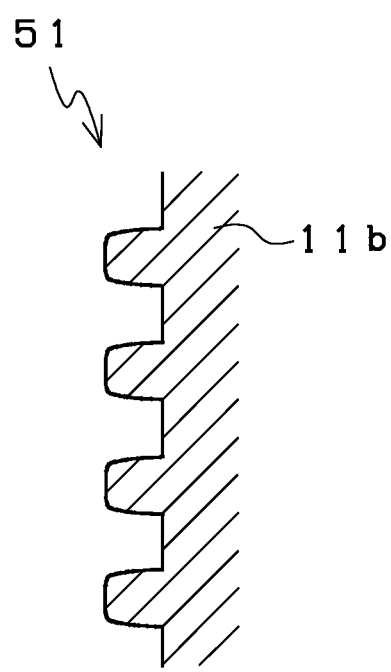
FIG. 3B is a cross-sectional view of the planar lighting unit according to the first embodiment of the present application, taken along line B-B'.

Next, the anti-slip portion 51 disposed on the light entrance side face 11b of the recessed portion 11 will be described in detail with reference to FIGS. 3A and 3B. FIG.

3A is a partial plan view of the anti-slip portion 51. FIG. 3B is a cross-sectional view of the anti-slip portion 51, taken along line B-B' of FIG. 3A. As illustrated in FIGS. 3A and 3B, the anti-slip portion 51 includes a linear uneven structure on the surface of the light entrance side face 11b.

The uneven structure of the anti-slip portion 51 includes a plurality of ridge lines formed along the fitting direction (arrow H) of the elastomer 30 in the recessed portion 11. The right side in FIG. 3A is the light entrance face 11a and the left side is the top edge 11d of the recessed portion 11. The purpose of the uneven structure of the anti-slip portion 51 is to increase the surface area of the light entrance side face 11b. Therefore, the cross-sectional shape of the uneven structure is not limited and may, for example, be triangular or semicircular. Note that this configuration also applies to the anti-slip portion 52 formed on the surface of the light entrance side face 11c facing the light entrance side face 11b (see FIG. 2).

When the elastomer 30 is fitted into the recessed portion 11, the elastomer 30 becomes sandwiched and compressed between the light entrance side faces 11b and 11c. The surface of the elastomer 30 deforms to match the uneven structures of the anti-slip portions 51 and 52. This configuration increases the contact area between the light entrance side faces 11b and 11c of the recessed portion 11 and the elastomer 30, which leads to an increase in adhesion. As a result, the elastomer 30 remains fitted in the recessed portion 11 of the light guide plate 10 and does not become displaced from or fall out of the light guide plate 10.

Next, steps of a process for assembling the planar lighting unit 1 will be described with reference to FIGS. 4 to 9.

Figure 4:
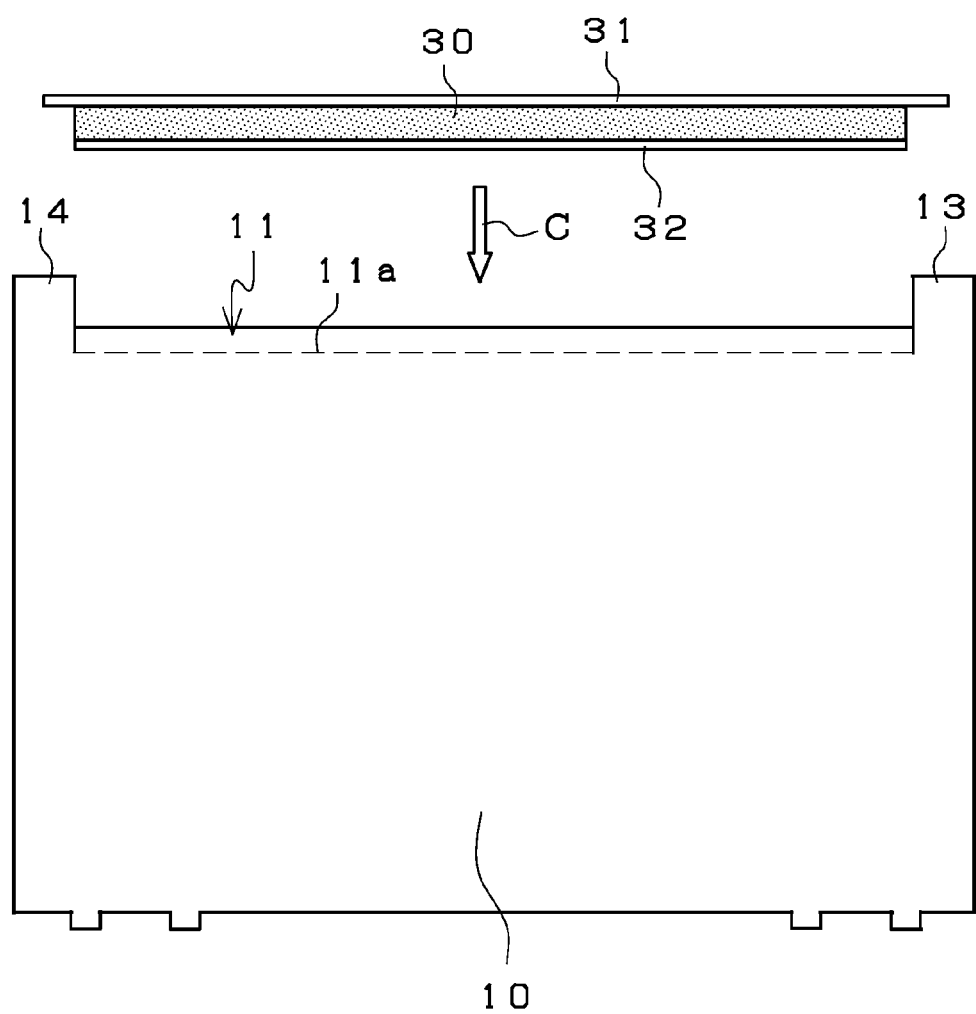
FIG. 4 is a plan view of the planar lighting unit according to the first embodiment of the present application, and illustrates step 1 of an assembly process of the planar lighting unit.
Figure 5:
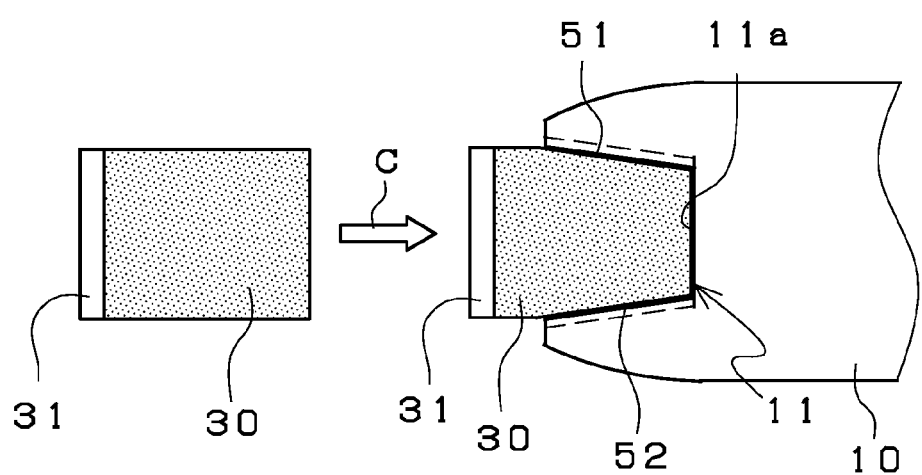
FIG. 5 is a cross-sectional view of the planar lighting unit according to the first embodiment of the present application, and illustrates step 1 of the assembly process.

FIGS. 4 and 5 illustrate a step of affixing the elastomer 30 (step 1).

As illustrated in FIG. 4, elongated separators (mounts) 31 and 32 are respectively adhered to the top and bottom surfaces of the elastomer 30. The separator 31 on the top of the elastomer 30 is longitudinally longer than the elastomer 30 and protrudes from both ends of the elastomer 30. In the affixing step illustrated in FIG. 4, first, the separator 32 adhered to the light entrance face 11a (the bottom) side of the elastomer 30 is removed. Then, while holding both ends (the protruding portions) of the separator 31 on the top of the elastomer 30, the elastomer 30 is moved in the direction of the arrow C and fitted into the recessed portion 11 of the light guide plate 10.

Next, a weak force is applied to the elastomer 30 by pressing on the separator 31. As a result, the elastomer 30 is pressed against the light entrance face 11a of the recessed portion 11, becomes adhered to the light entrance side faces 11b and 11c (see FIG. 2) and, thus, is affixed to the light guide plate 10. Finally, the separator 31 is removed.

FIG. 5 is a cross-sectional view of the planar lighting unit 1, and illustrates the relationship between the elastomer 30 and the recessed portion 11 of the light guide plate 10 in the affixing step. FIG. 5 illustrates the elastomer 30 from which the separator 32 has been removed (see FIG. 4), and also illustrates the elastomer 30 after having been moved in the direction of the arrow C and fitted into the recessed portion 11. As described previously, the elastomer 30 is moved and pressed against the light entrance face 11a while holding the separator 31. The pressing causes the elastomer 30 to deform to match the shape of the recessed portion 11 and closely contact the anti-slip portions 51 and 52. Due to this close contact, the contact area between the elastomer 30 and the anti-slip portions 51 and 52 increases and, as a result, the adhesion between the elastomer 30 and the anti-slip portions 51 and 52 increases. As a result, the elastomer 30 is prevented from becoming displaced from or falling out of the light guide plate 10 in subsequent steps of the assembly process.

Figure 6:
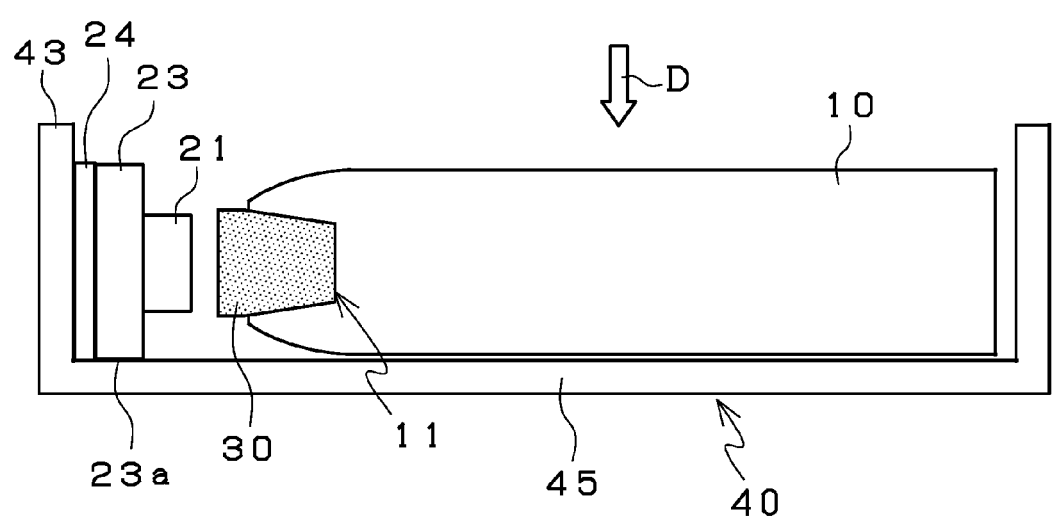
FIG. 6 is a cross-sectional view of the planar lighting unit according to the first embodiment of the present application, and illustrates step 2 of the assembly process.

Next, a step of housing the board 23 and the light guide plate 10 in the rear frame 40 (step 2) will be described with reference to FIG. 6. As illustrated in FIG. 6, at the initial stage of step 2, the board 23 on which the LEDs 21 are mounted is affixed to the inside of the first side wall 43 of the rear frame 40 using heat-transfer tape 24. At this time, a bottom surface 23a of the board 23 is preferably abutted against the bottom plate 45 of the rear frame 40 to fix the board 23. Positioning the board 23 in this manner prevents positional deviations of the board 23.

Next, the light guide plate 10, having the elastomer 30 fitted in the recessed portion 11, is placed on the bottom plate 45 of the rear frame 40 (is moved in the direction of the arrow D). At this time, there is no stress on the elastomer 30. That is, as described previously, due to the increased adhesion between the elastomer 30 and the recessed portion 11 of the light guide plate 10, the elastomer 30 does not become displaced from or fall out of the recessed portion 11.

Figure 7:
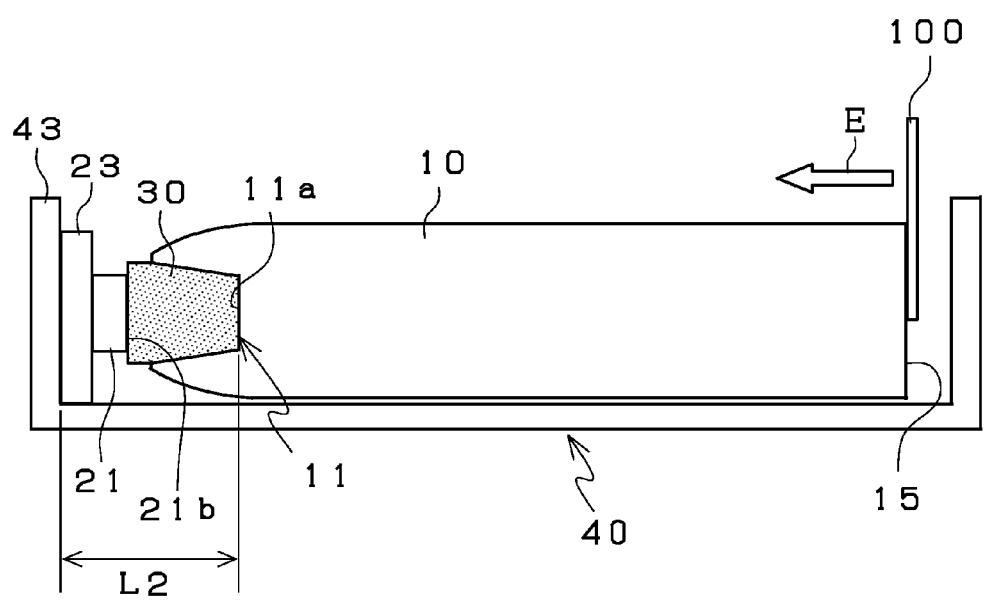
FIG. 7 is a cross-sectional view of the planar lighting unit according to the first embodiment of the present application, and illustrates step 3 of the assembly process.

Next, a step of pressing the light guide plate 10 (step 3) will be described with reference to FIG. 7. As illustrated in FIG. 7, pressure in the direction of the arrow E is applied to the back surface 15 of the light guide plate 10 housed in the rear frame 40. The pressure is applied using a pressing jig 100. Using this pressing jig 100, the light guide plate 10 is pressed until the supports 13 and 14 (see FIG. 1) abut against the first side wall 43 of the rear frame 40.

Figure 2:
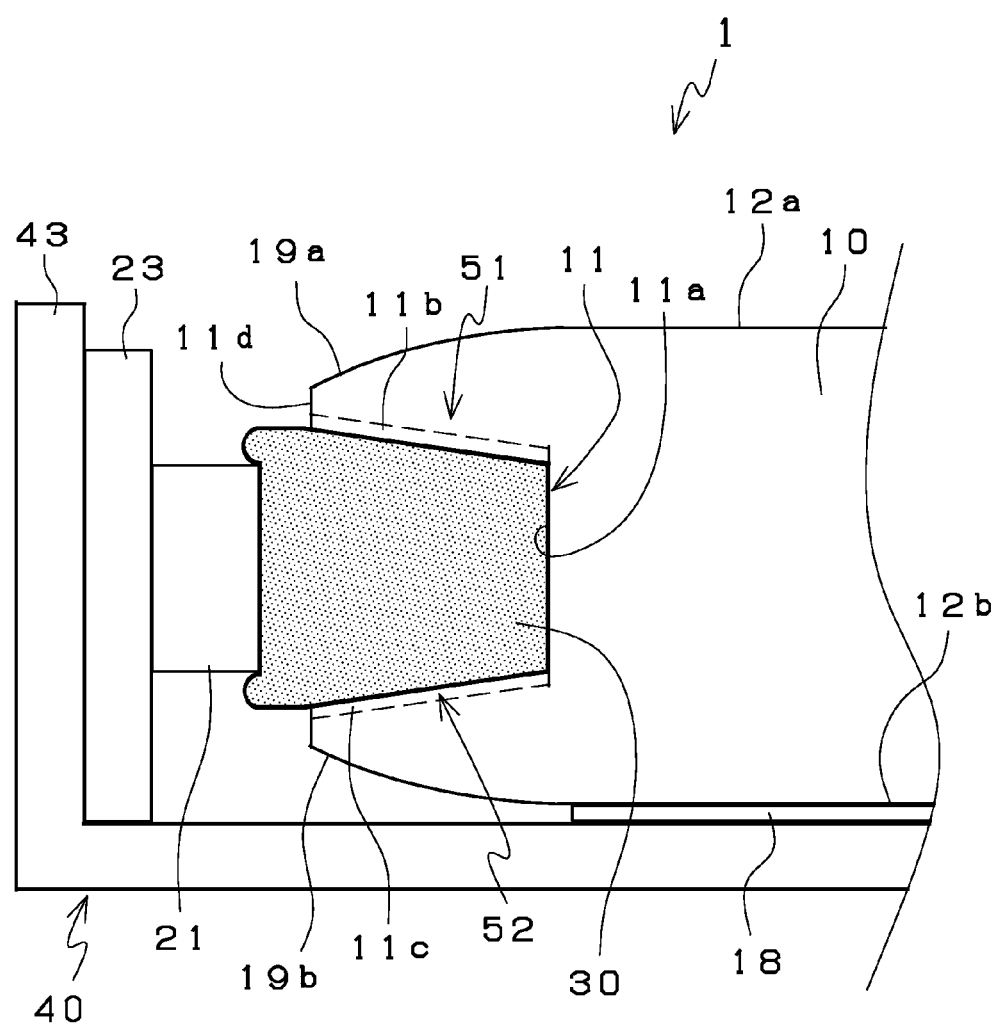
FIG. 2 is a cross-sectional view of the planar lighting unit illustrated in FIG. 1, taken along line A-A'.

It is preferable that a sum length L2 of the thicknesses of the board 23, one of the LEDs 21, and the elastomer 30 (FIG. 7 illustrates a state prior to pressing) is designed to be a predetermined amount ΔL longer than the protruding length L1 of the supports 13 and 14 (see FIG. 1). This configuration will cause the flexible elastomer 30 to be compressively deformed the predetermined amount ΔL when the light guide plate 10 is pressed using the pressing jig 100. As a result, the elastomer 30 will closely contact emission surfaces 21b of the LEDs 21 and the light entrance face 11a of the light guide plate 10. Thus, an air layer will not be present between the emission surfaces 21b of the LEDs 21 and the light entrance face 11a of the light guide plate 10. Note that ΔL is a measure of the compressive deformation of the elastomer 30 and is set to be within a range, determined by experimenting, in which the LEDs 21 are not destroyed by the pressure exerted by the elastomer 30.

Figure 8:
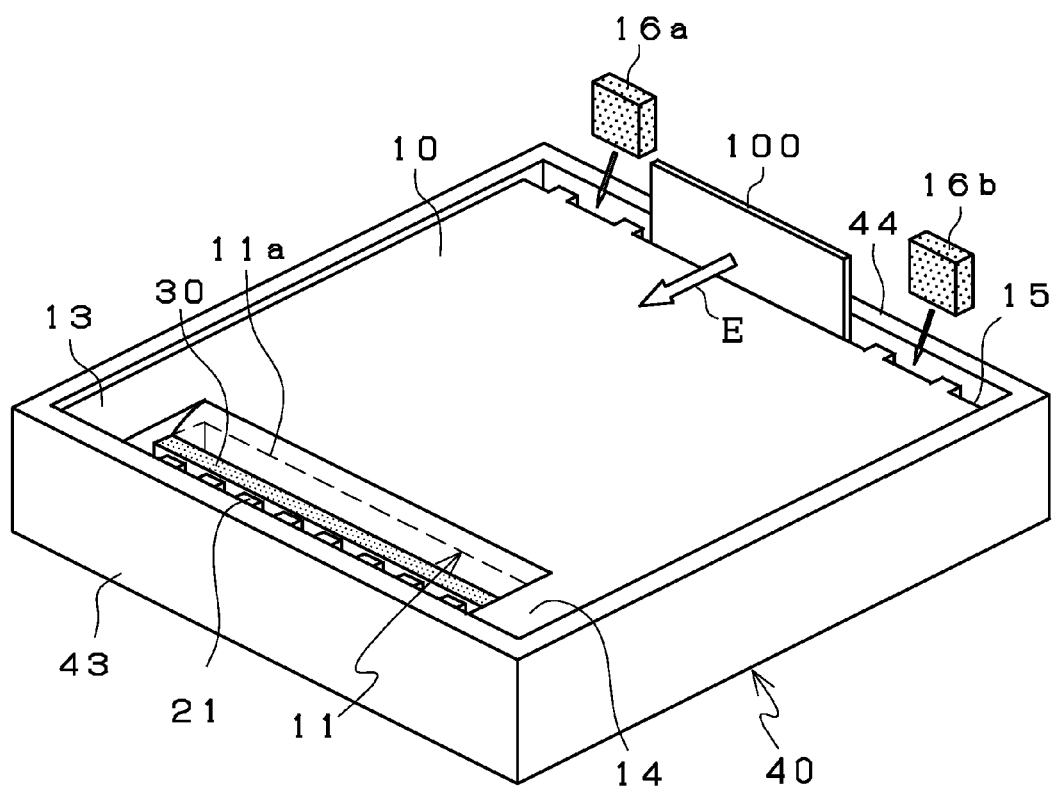
FIG. 8 is a perspective view of the planar lighting unit according to the first embodiment of the present application, and illustrates step 4 of the assembly process.

Next, a step of fixing the light guide plate 10 (step 4) will be described with reference to FIG. 8. As illustrated in FIG. 8, step 4 includes inserting elastic members 16a and 16b after the completion of the preceding step 3. First, the light guide plate 10 is pressed in the direction of the arrow E using the pressing jig 100 until the supports 13 and 14 are abutted against the first side wall 43 of the rear frame 40. Then, the elastic members 16a and 16b are inserted in the gap between the back surface 15, which is on the side opposite the light entrance face 11a, of the light guide plate 10 and the second side wall 44 of the rear frame 40. As a result, the light guide plate 10 becomes fixed to the rear frame 40 by the elastic force of the elastic members 16a and 16b.

The light guide plate 10 can be fixed to the rear frame 40 simply by carrying out steps 3 and 4 and horizontally moving the light guide plate 10 a short distance (approximately ΔL+α). In this case, the elastomer 30 fitted into the recessed portion 11 will not become displaced from or fall out of the recessed portion 11 and, as such, will be correctly interposed between the LEDs 21 and the light guide plate 10.

Accordingly, with the planar lighting unit 1, assembly workability when fixing the light guide plate 10 to the rear frame 40 will be excellent.

Figure 9:
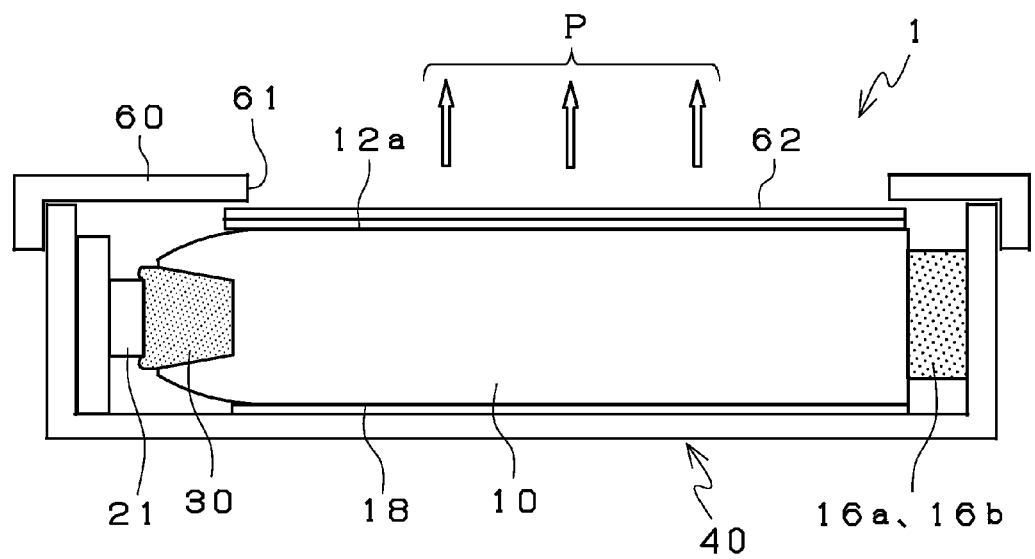
FIG. 9 is a cross-sectional view of the planar lighting unit according to the first embodiment of the present application, and illustrates step 5 of the assembly process.

Next, a final assembly step of the planar lighting unit 1 (step 5) will be described with reference to FIG. 9. As illustrated in FIG. 9, an optical sheet 62 is laminated on the light exit face 12a of the light guide plate 10 fixed to the rear frame 40. The optical sheet 62 is formed by laminating a diffusion sheet on the light exit face 12a and laminating a prism sheet on the diffusion sheet. If deemed necessary, a reflective polarizer may be laminated on the prism sheet.

Next, a front frame 60 having a frame-like shape is placed over the rear frame 40 and locked to the rear frame 40 using hooks or the like (not illustrated). Thus, the assembly of the planar lighting unit 1 is completed. As illustrated in FIG. 9, light P passes through the light exit face 12a of the light guide plate 10, the optical sheet 62, and an opening 61 in the front frame 60. As a result, the light guide plate 10 emits light.

Figure 10:
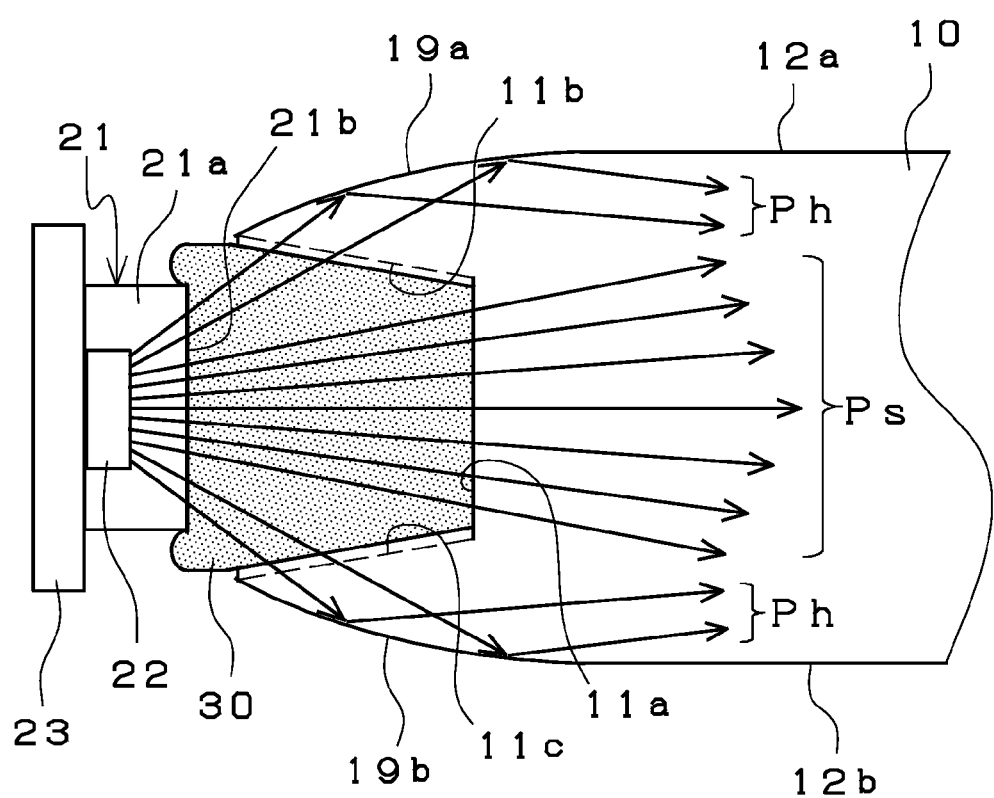
FIG. 10 is an enlarged cross-sectional view of the planar lighting unit according to the first embodiment of the present application, and illustrates a light guiding state.

The light guiding state in the planar lighting unit 1 will be described with reference to FIG. 10. FIG. 10 is an enlarged view of only the constituents illustrated in FIG. 2 that relate to the optical characteristics of the planar lighting unit 1. In FIG. 10, arrows are used to depict the light rays entering the light guide plate 10 from the LEDs 21 and propagating within the light guide plate 10.

As illustrated in FIG. 10, reflective curved surfaces 19a and 19b are disposed on the top and bottom surfaces of the light guide plate 10, adjacent to the light entrance face 11a of the light guide plate 10. Additionally, a plurality of dots (not illustrated) are disposed on the reflective face 12b positioned opposite the light exit face 12a of the light guide plate 10. The plurality of dots change the travel direction of the light propagating within the light guide plate 10 and cause the light to exit through the light exit face 12a. A reflective sheet (not illustrated) is disposed on the bottom surface side of the reflective face 12b, with an air layer interposed therebetween.

It is well-known that reflection occurs when light passes from a medium having a refractive index of n1 to a medium having a refractive index of n2 (hereinafter referred to as "Fresnel loss"). Greater differences between the refractive index n1 and the refractive index n2 result in greater Fresnel loss. As described previously, with the planar lighting unit 1, the refractive indexes of the fluorescent resin of the LEDs 21, the elastomer 30 between the LEDs 21 and the light guide plate 10, and the light guide plate 10 are approximately 1.5. As such, there is almost no difference in the refractive indexes between the emission surfaces 21b of the LEDs 21 and the light entrance face 11a of the light guide plate 10. That is, there is nearly no Fresnel loss in the planar lighting unit 1 of the present embodiment and, as such, high luminous efficiency is obtained.

Accordingly, the light rays traveling from the LED chips 22 of the LEDs 21 toward the light guide plate 10, the light rays Ps near the center are guided into the light guide plate 10 without almost any Fresnel loss. This is because the fluorescent resin 21a sealing the LED chips 22 and the light entrance face 11a of the light guide plate 10 closely contact each other, both mechanically and optically, via the elastomer 30.

The light rays Ph traveling diagonally upward (or diagonally downward) pass through the light entrance side faces 11b and 11c of the recessed portion 11 and diagonally enter the light guide plate 10. Then, these light rays Ph totally reflect at the reflective curved surfaces 19a and 19b and are guided into the interior of the light guide plate 10. In a case where the reflective curved surfaces 19a and 19b are not provided, most of these light rays Ph would leak out through the top surface and bottom surface of the light guide plate 10. Therefore, not only is high luminous efficiency provided by the planar lighting unit 1 due to the fact that almost no Fresnel loss occurs, but the luminous efficiency is further improved due to the reflective curved surfaces 19a and 19b.

In planar lighting units that do not have uneven structures on the light entrance side faces, regions of comparatively higher brightness (hereinafter referred to as "hot spots"), have been observed in the light exit face 12a adjacent to the boundary with the reflective curved surface 19a. However, with to the planar lighting unit 1 of the present embodiment, hot spots adjacent to the boundary are eliminated and uniform brightness across the light exit surface 12 is obtained. The elimination of the hot spots is thought to be the result of the uneven structures on the light entrance side faces diffusing the light when unexpected light ray collection occurs on the light entrance side faces.

As described previously, the planar lighting unit 1 according to the present embodiment includes the recessed portion 11 in the light guide plate 10. Additionally, the recessed portion 11 includes the light entrance side faces 11b and 11c facing each other across the light entrance face 11a, and the anti-slip portions 51 and 52 having the uneven structures are respectively disposed on the light entrance side face 11b and 11c. The configuration including the anti-slip portions 51 and 52 increases the contact area between the light guide plate 10 and the elastomer 30, which leads to an increase in adhesion. That is, due to the fact that the planar lighting unit 1, which includes the elastomer 30 having high flexibility between the LEDs 21 and the light guide plate 10, includes the recessed portion 11, positional deviation between the LEDs 21 and the light guide plate 10 is prevented. This configuration eliminates the need for adjusting to eliminate positional deviation. Furthermore, this configuration facilitates ease of assembly due to the fact that the anti-slip portions 51 and 52 prevent the elastomer 30 from becoming displaced from or falling out of the recessed portion 11 of the light guide plate 10.

Second Embodiment

A planar lighting unit 2 according to a second embodiment of the present application will be described with reference to FIGS. 11, 12A, and 12B. Note that the planar lighting unit 2 differs from the planar lighting unit 1 according to the first embodiment (see FIGS. 1 and 2) only on the point of the uneven structures disposed on the light entrance side faces 11b and 11c of the recessed portion 11. As such, FIG. 1, FIGS. 3 to 10, and the descriptions given with reference thereto can be applied to the planar lighting unit 2. Therefore, the description in the second embodiment will focus on the configuration of the recessed portion 11, and description of other configurations is omitted.

Figure 11:
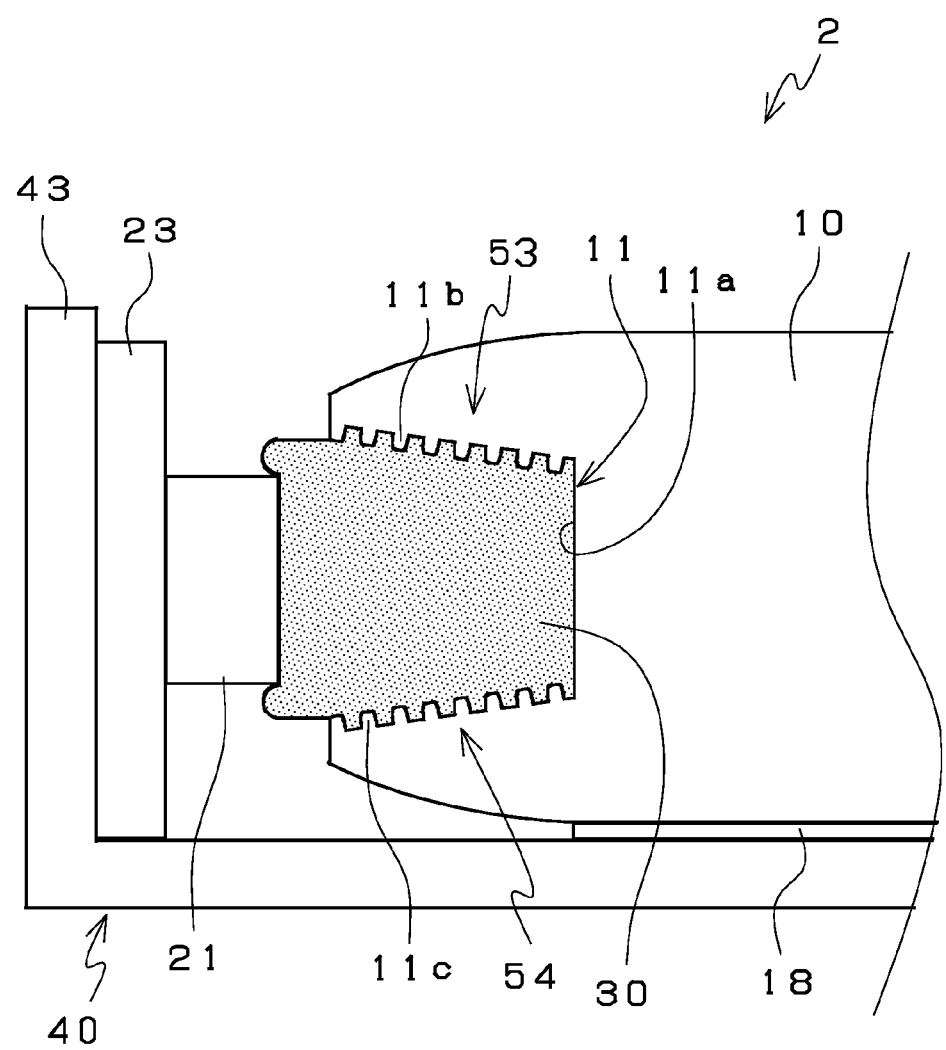
FIG. 11 is a cross-sectional view of a planar lighting unit according to a second embodiment of the present application, taken along line A-A' of FIG. 1.
Figure 12A:
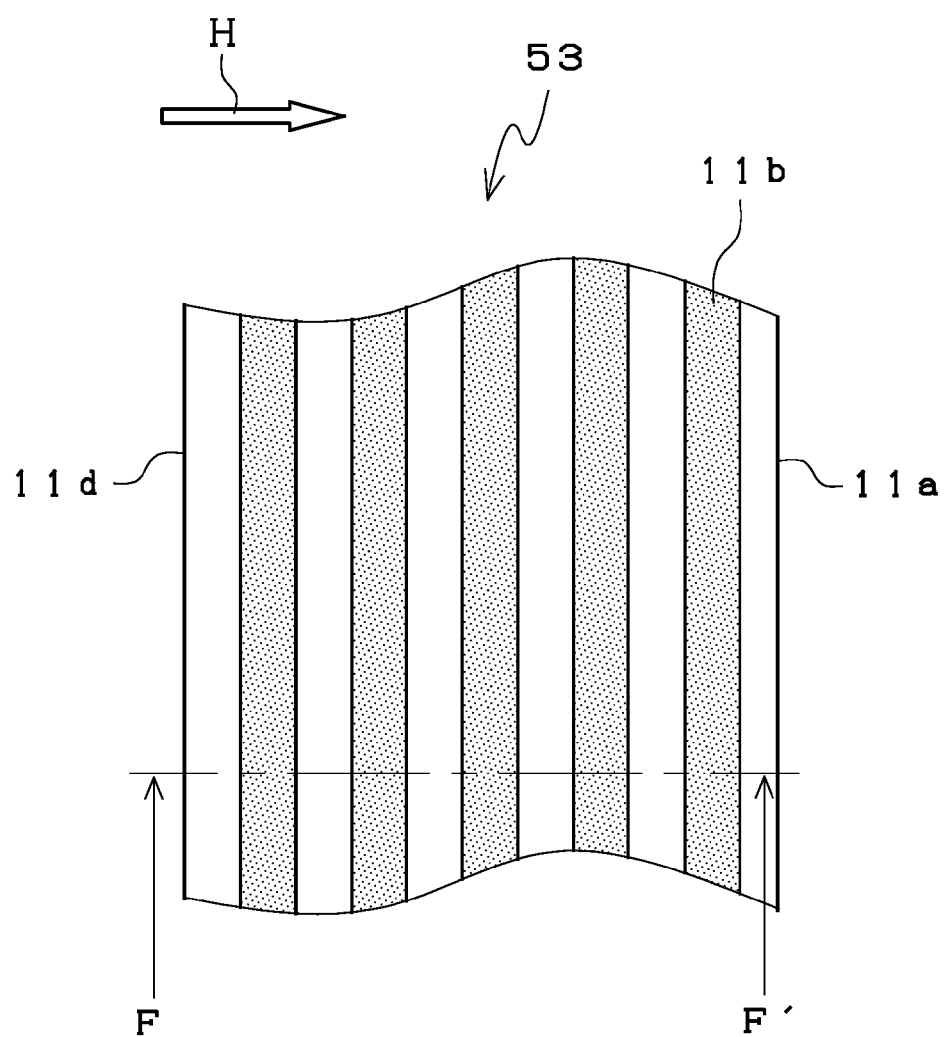
FIG. 12A is a partial plan view of an anti-slip portion of the planar lighting unit according to the second embodiment of the present application.
Figure 12B:
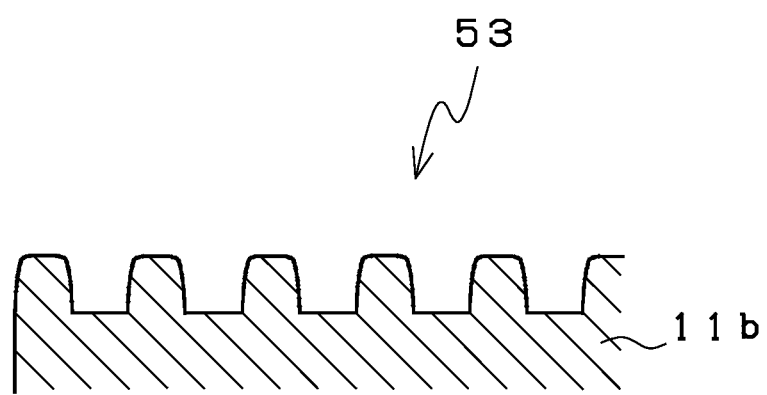
FIG. 12B is a cross-sectional view of the planar lighting unit according to the second embodiment of the present application, taken along line F-F' of FIG. 12A.

FIG. 11 corresponds to a cross-section taken along line A-A' of FIG. 1. As illustrated in FIG. 11, the recessed portion 11 of the light guide plate 10 includes a light entrance face 11a on the bottom surface and light entrance side faces 11b and 11c facing each other across the light entrance face 11a, similar to the first embodiment. Anti-slip portions 53 and 54 having uneven structures are respectively disposed on the light entrance side faces 11b and 11c.

A configuration is possible in which the anti-slip portions 53 or 54 is disposed on only one of the light entrance side faces 11b and 11c. Details of the configuration of the anti-slip portions 53 and 54 will be discussed later with reference to FIGS. 12A and 12B. The elastomer 30 is fitted into the recessed portion 11 and compressed and, as a result, deforms to match the shape of the recessed portion 11. The elastomer 30 closely contacts the light entrance face 11a of the light guide plate 10 and also deforms to mate with the uneven structures of the anti-slip portions 53 and 54 so as to closely contact the light entrance side faces 11b and 11c.

Next, the anti-slip portion 53 disposed on the light entrance side face 11b of the recessed portion 11 will be described in detail with reference to FIGS. 12A and 12B. FIG. 12A is a partial plan view of the anti-slip portion 53. FIG. 12B is a cross-sectional view of the anti-slip portion 53, taken along line F-F' of FIG. 12A. As illustrated in FIGS. 12A and 12B, the anti-slip portion 53 is a linear uneven structure formed on the surface of the light entrance side face 11b.

The uneven structure of the anti-slip portion 53 includes a plurality of ridge lines formed in a direction orthogonal to the fitting direction (arrow H) of the elastomer 30 in the recessed portion 11. The purpose of the uneven structure of the anti-slip portion 53 is to increase the surface area of the light entrance side face 11b. Therefore, the cross-sectional shape of the uneven structure is not limited and may, for example, be triangular or semicircular. Note that this configuration also applies to the anti-slip portion 54 formed on the surface of the light entrance side face 11c facing the light entrance side face 11b (see FIG. 11).

When the elastomer 30 is fitted into the recessed portion 11 (see FIG. 11), the elastomer 30 is sandwiched and compressed between the light entrance side faces 11b and 11c, and the surfaces of the elastomer 30 deform to match the uneven structures of the anti-slip portions 53 and 54. This configuration increases the contact area between the light entrance side faces 11b and 11c of the recessed portion 11 and the elastomer 30, which leads to an increase in adhesion. As a result, the elastomer 30 remains fitted in the recessed portion 11 of the light guide plate 10 and does not become displaced from or fall out of the light guide plate 10.

As described previously, according to the planar lighting unit 2, the ridge lines of the uneven structures disposed on the anti-slip portions 53 and 54 are formed in the direction orthogonal to the fitting direction of the elastomer 30 in the recessed portion 11 of the light guide plate 10. The configuration including the anti-slip portions 53 and 54 increases the contact area between the light guide plate 10 and the elastomer 30, which leads to an increase in adhesion. As a result, the planar lighting unit 2 provides advantageous effects similar to the advantageous effects of the planar lighting unit 1 according to the first embodiment.

As described previously, the ridge lines of the anti-slip portions 53 and 54 are formed in the direction orthogonal to the fitting direction of the elastomer 30. As such, resistance forces against the direction in which the elastomer 30 falls out of the recessed portion 11 are generated. These resistance forces cause the elastomer 30 to be less likely to fall out of the recessed portion 11 than with the planar lighting unit 1 according to the first embodiment. The assembly process and light guiding state of the planar lighting unit 2 are the same as the assembly process and light guiding state of the planar lighting unit 1 and, as such, description thereof is omitted.

Third Embodiment

A planar lighting unit 3 according to a third embodiment of the present application will be described with reference to FIGS. 13, 14A, and 14B. Note that the planar lighting unit 3 differs from the planar lighting unit 1 according to the first embodiment (see FIGS. 1 and 2) only on the point of the uneven structures disposed on the light entrance side faces 11b and 11c of the recessed portion 11. As such, FIG. 1, FIGS. 3 to 10, and the descriptions given with reference thereto can be applied to the planar lighting unit 3. Therefore, the description in the third embodiment will focus on the configuration of the recessed portion 11, and description of other configurations is omitted.

Figure 13:
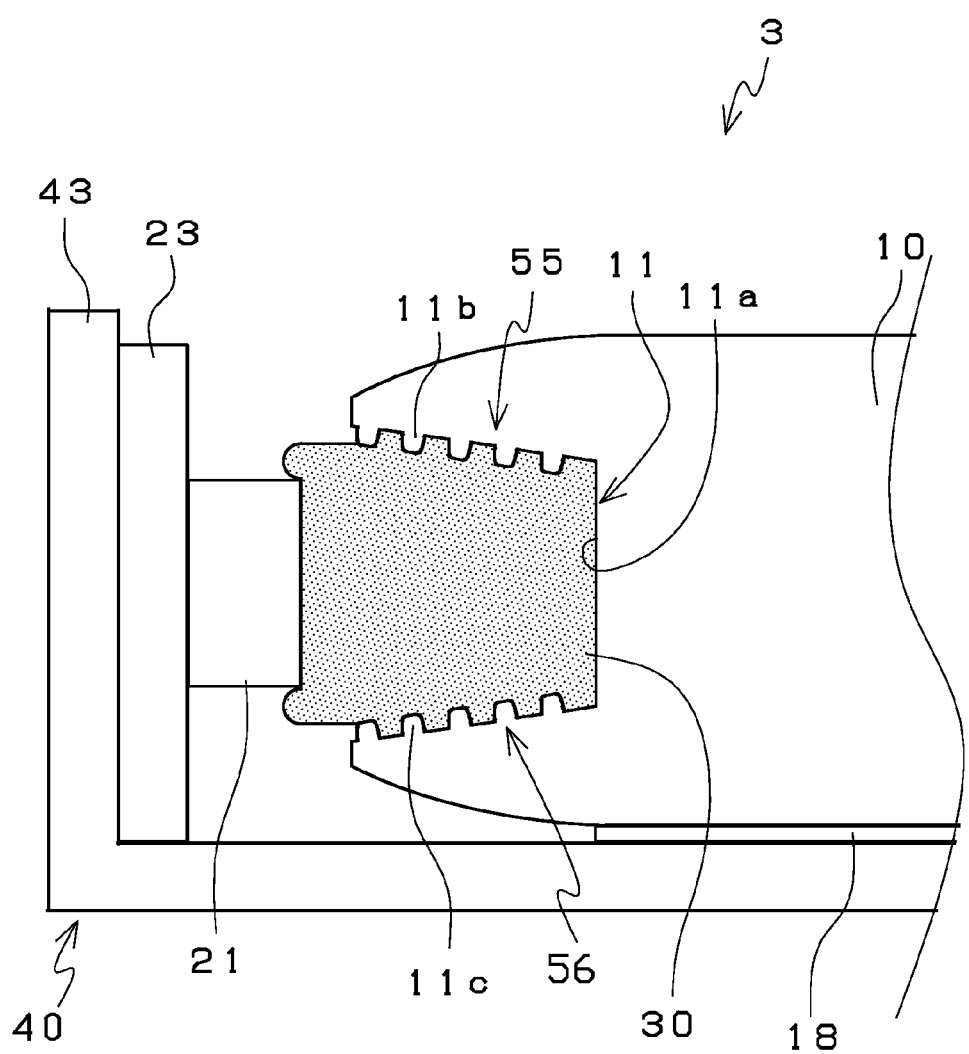
FIG. 13 is a cross-sectional view of a planar lighting unit according to a third embodiment of the present application, taken along line A-A' of FIG. 1.

FIG. 13 corresponds to a cross-section taken along line A-A' of FIG. 1. As illustrated in FIG. 13, the recessed portion 11 of the light guide plate 10 includes a light entrance face 11a on the bottom surface and light entrance side faces 11b and 11c facing each other across the light entrance face 11a, similar to the first embodiment. Anti-slip portions 55 and 56 having uneven structures are respectively disposed on the light entrance side faces 11b and 11c.

However, a configuration is possible in which the anti-slip portions 55 or 56 is disposed on only one of the light entrance side faces 11b and 11c. Details of the configuration of the anti-slip portions 55 and 56 will be discussed later with reference to FIGS. 14A and 14B. The elastomer 30 is fitted into the recessed portion 11 and compressed and, as a result deforms to match the shape of the recessed portion 11. This deformation results in the elastomer 30 closely contacting the light entrance face 11a of the light guide plate 10 and deforming to mate with the uneven structure of the anti-slip portions 55 and 56 so as to closely contact the light entrance side faces 11b and 11c.

Next, the anti-slip portion 55 disposed on the light entrance side face 11b of the recessed portion 11 will be described in detail with reference to FIGS. 14A and 14B. FIG. 14A is a partial plan view of the anti-slip portion 55. FIG. 14B is a cross-sectional view of the anti-slip portion 55, taken along line G-G' of FIG. 14A.

Figure 14A:
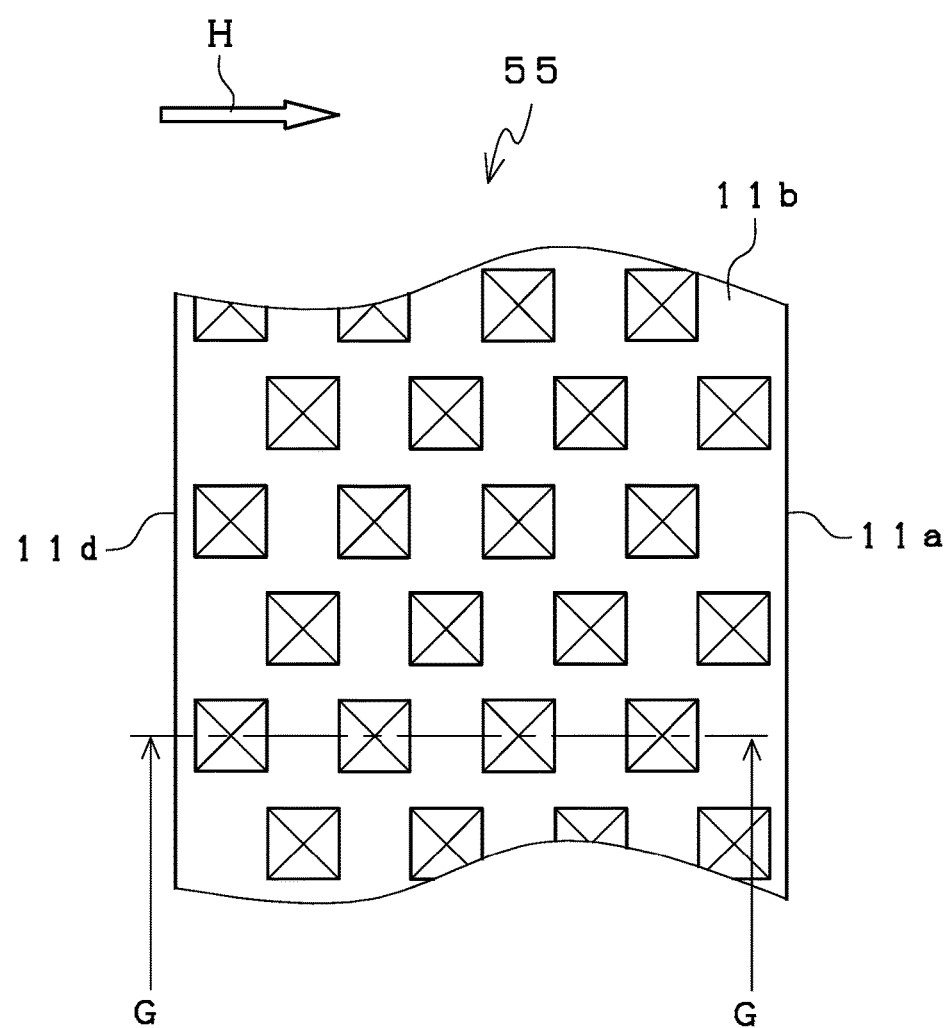
FIG. 14A is a partial plan view of an anti-slip portion of the planar lighting unit according to the third embodiment of the present application.
Figure 14B:
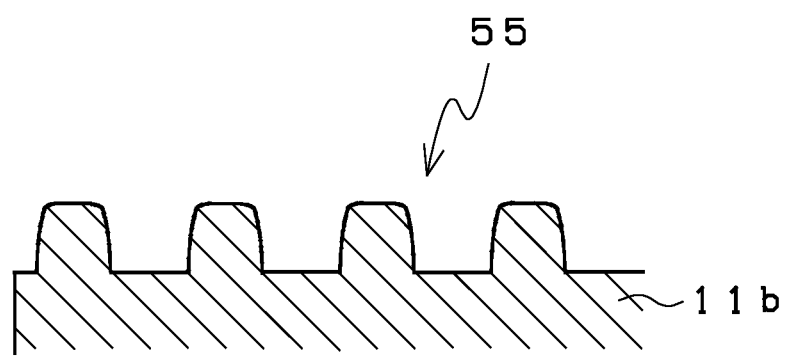
FIG. 14B is a cross-sectional view of the planar lighting unit according to the third embodiment of the present application, taken along line G-G' of FIG. 14A.

As illustrated in FIGS. 14A and 14B, the uneven structure of the anti-slip portion 55 is formed from a collection of independent dots. FIG. 14A depicts an example of an uneven structure in which positions of adjacent dots are offset ½ pitch in the fitting direction (arrow H) of the elastomer 30. However, the configuration of the uneven structure is not limited thereto. For example, the uneven structure may have a configuration in which a plurality of dots are randomly disposed.

The purpose of the uneven structure of the anti-slip portion 55 is to increase the surface area of the light entrance side face 11b. Therefore, the cross-sectional shape of the uneven structure is not limited and may, for example, be triangular or semicircular. Note that this configuration also applies to the anti-slip portion 56 formed on the surface of the light entrance side face 11c facing the light entrance side face 11b (see FIG. 13).

When the elastomer 30 is fitted into the recessed portion 11 (see FIG. 13), the elastomer 30 is sandwiched and compressed between the light entrance side faces 11b and 11c, and the surfaces of the elastomer 30 deform to match the uneven structures of the anti-slip portions 55 and 56. This configuration increases the contact area between the light entrance side faces 11b and 11c of the recessed portion 11 and the elastomer 30, which leads to an increase in adhesion. As a result, the elastomer 30 remains fitted in the recessed portion 11 of the light guide plate 10 and does not become displaced from or fall out of the light guide plate 10.

As described previously, the uneven structures of the anti-slip portions 55 and 56 of the planar lighting unit 3 are formed from collections of dots. The configuration including the anti-slip portions 55 and 56 increases the contact area between the light guide plate 10 and the elastomer 30, which leads to an increase in adhesion. As a result, the planar lighting unit 3 provides advantageous effects similar to the advantageous effects of the planar lighting unit 1 according to the first embodiment.

The uneven structures of the anti-slip portions 55 and 56 are formed from pluralities of dots and, as such, large resistance forces are generated in both the direction in which the elastomer 30 falls out of the recessed portion 11 and the direction orthogonal to the direction in which the elastomer 30 falls out of the recessed portion 11. The assembly process and light guiding state of the planar lighting unit 3 are the same as the assembly process and light guiding state of the planar lighting unit 1 and, as such, description thereof is omitted.

Fourth Embodiment

Figure 15:
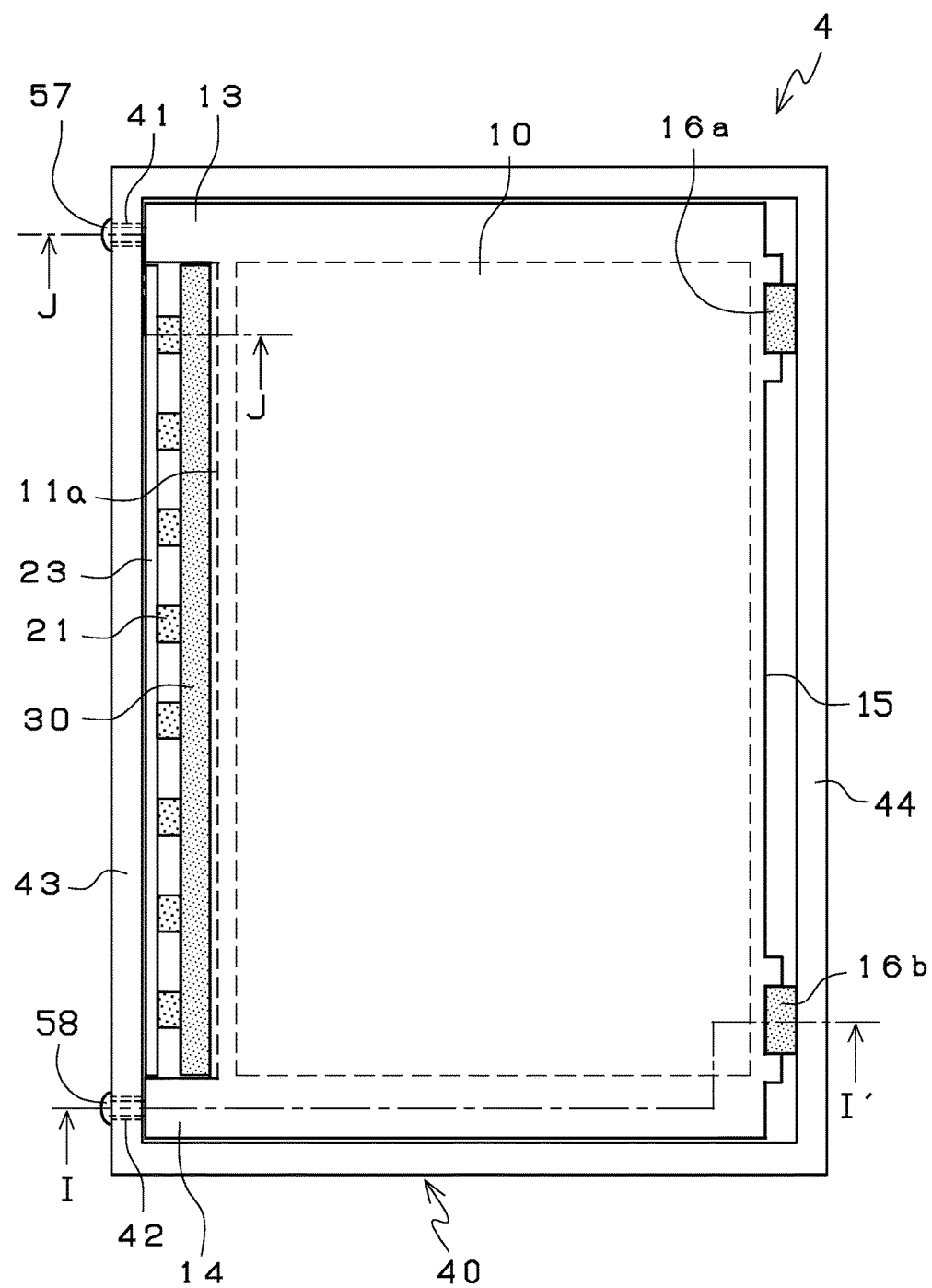
FIG. 15 is a plan view of a planar lighting unit according to a fourth embodiment of the present application.

A configuration of a planar lighting unit 4 according to a fourth embodiment of the present application will be described with reference to FIG. 15. Note that the planar lighting unit 4 differs from the planar lighting unit 1 according to the first embodiment only on the point of the means used to fix the light guide plate 10 to the rear frame 40. Accordingly, description will focus on the configuration differences. As illustrated in FIG. 15, the planar lighting unit 4 includes a light guide plate 10, a plurality of LEDs 21, a board 23 on which the plurality of LEDs 21 are mounted, a transparent flexible resin, namely an elastomer 30, between the LEDs 21 and the light guide plate 10, and a rear frame 40 that houses the light guide plate 10, the LEDs 21, the board 23, and the elastomer 30.

The light guide plate 10 includes supports 13 and 14. The supports 13 and 14 are respectively disposed on each side (top and bottom in the drawing) of the light entrance face 11a. Caulking members 57 and 58 are used as the fixing means and are respectively disposed on the tips of the supports 13 and 14. Note that the tips of the caulking members 57 and 58 illustrated in FIG. 15 have been heated and deformed. The caulking members 57 and 58, which have not been subjected to heating, can be integrally molded with the light guide plate 10. Additionally, caulking holes 41 and 42 are formed in a first side wall 43 of the rear frame 40. The caulking members 57 and 58 are inserted through the caulking holes 41 and 42.

Figure 16:
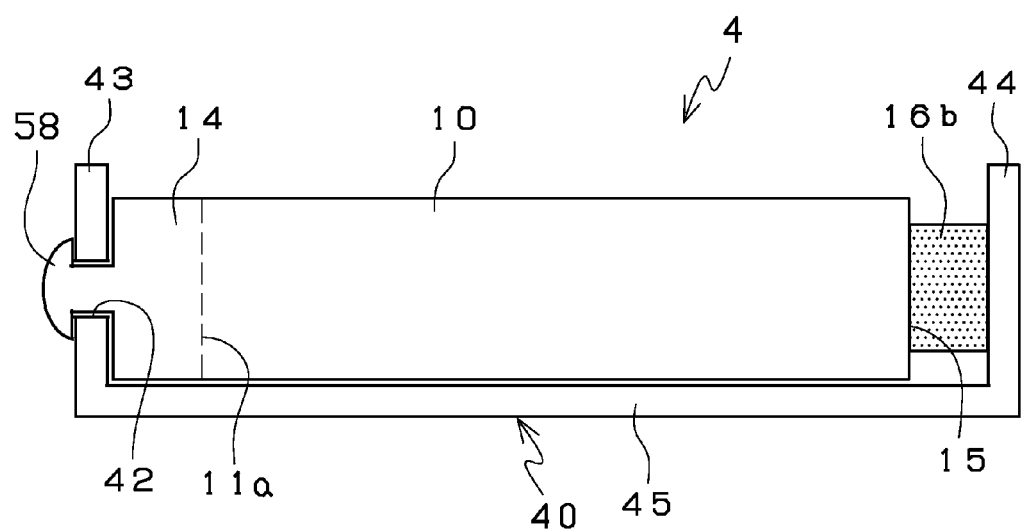
FIG. 16 is a cross-sectional view of the planar lighting unit illustrated in FIG. 15, taken along line I-I'.

Next, the fixed state of the light guide plate 10 to the rear frame 40 in the planar lighting unit 4 will be described with reference to FIG. 16. FIG. 16 is a cross-sectional view of the planar lighting unit 4, taken along line I-I' of FIG. 15. As illustrated in FIG. 16, the light guide plate 10 is housed in the rear frame 40. The rear frame 40 includes the first side wall 43 on the side where the support 14 of the light guide plate 10 abuts, the second side wall 44 on the back surface 15 side of the light guide plate 10, and the bottom plate 45 on the bottom surface.

The caulking member 58 is disposed on the tip of the support 14 and the caulking hole 42 is formed in the first side wall 43. The caulking member 58, which has not been heated, is inserted through the caulking hole 42 when housing the light guide plate 10 in the rear frame 40. Thereafter, the tip of the caulking member 58 is heated and deformed (subjected to heated caulking treatment). The heated caulking treatment causes the tip of the caulking member 58 to deform and become diametrically larger than the diameter of the caulking hole 42, which results in the light guide plate 10 becoming fixed to the rear frame 40.

The elastic member 16b is inserted in the gap between the back surface 15 of the light guide plate 10 and the second side wall 44 of the rear frame 40. The elastic force of the elastic member 16b supports the back surface 15 side of the light guide plate 10 in the rear frame 40. While not illustrated, the support 13 side is fixed to the rear frame 40 in same manner by the caulking member 57. On the support 13 side, the elastic member 16a is inserted in the gap between the back surface 15 of the light guide plate 10 and the second side wall 44 of the rear frame 40 (see FIG. 15).

In FIG. 16, gaps are illustrated between the light guide plate 10 and the bottom plate 45, the first side wall 43 and the support 14, and the first side wall 43 and the tip of the caulking member 58. However, these gaps do not actually exist and are only illustrated to clarify the positional relationships between the constituents for the sake of description (the same applies hereinafter). A reflective sheet may be disposed between the light guide plate 10 and the bottom plate 45, and on the back surface 15 side of the light guide plate 10. The elastic members 16a and 16b press on the back surface 15 side of the light guide plate 10 and supplement the fixing of the light guide plate 10 by the caulking members 57 and 58. As such, the elastic force of the elastic members 16a and 16b may be weak. Additionally, because the light guide plate 10 is tightly fixed to the rear frame 40 by the caulking members 57 and 58, the elastic members 16a and 16b may be omitted from the planar lighting unit 4.

Figure 17:
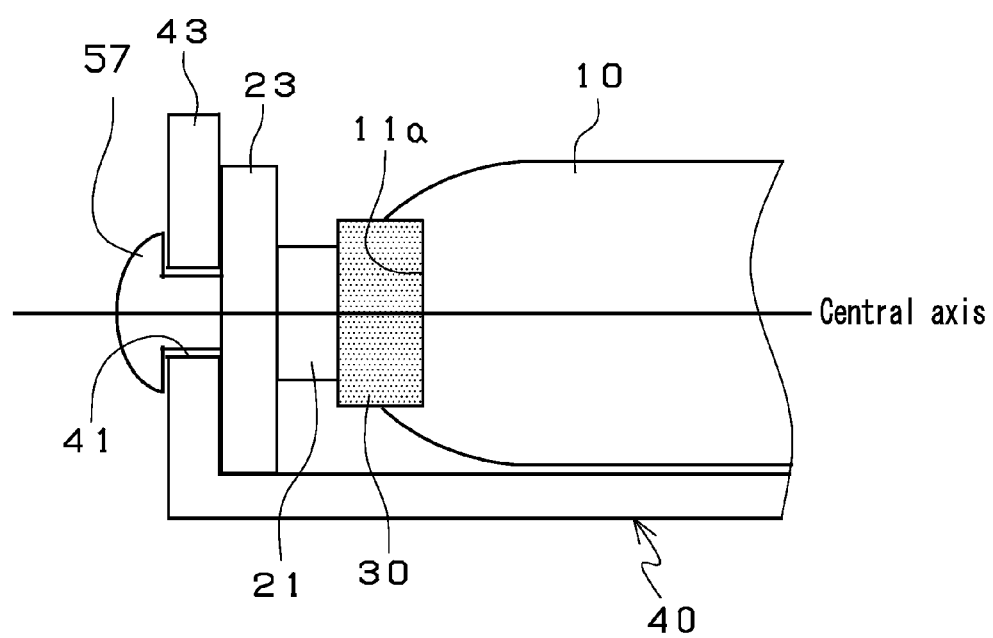
FIG. 17 is a cross-sectional view of the planar lighting unit illustrated in FIG. 15, taken along line J-J'.

Next, the positional relationship between the LEDs 21 and the light guide plate 10 of the planar lighting unit 4 will be described with reference to FIG. 17. FIG. 17 is a cross-sectional view of the planar lighting unit 4 illustrated in FIG. 15, taken along line J-J', and depicts the area adjacent to one of the LEDs 21. As illustrated in FIG. 17, the central axis of the caulking member 57, the central axis of the LED 21 mounted on the board 23, and the central axis of the light guide plate 10 coincide in the thickness direction. The same is true for the central axes on the caulking member 58 side (see FIG. 16).

Due to the fact that the central axes of these three constituents coincide, the light guide plate 10 will only exert central axis direction forces on the elastomer 30, even if an elastomer 30 having high flexibility is interposed between the LEDs 21 and the light guide plate 10. That is, only central axis direction forces will be exerted on the elastomer 30 and, as such, useless moments will not occur and positional deviation will not occur between the LEDs 21, the elastomer 30, and the light guide plate 10.

Additionally, because the central axes of the caulking members 57 and 58 fixed to the rear frame 40, the LED 21, and the light guide plate 10 coincide, the influence of deformation due to thermal expansion on positional deviation can be minimized, even when changes in the ambient temperature cause the light guide plate 10 and/or the board 23 to thermally expand and deform. As a result, positional deviation between the LEDs 21, the elastomer 30, and the light guide plate 10 is prevented.

The assembly process of the planar lighting unit 4 differs from the assembly process of planar lighting unit 1 according to the first embodiment only on the point of the step of fixing the light guide plate 10 to the rear frame 40 using the caulking members 57 and 58. As such, only the process of fixing using the caulking members 57 and 58 will be described with reference to FIGS. 18 and 19.

Figure 18:
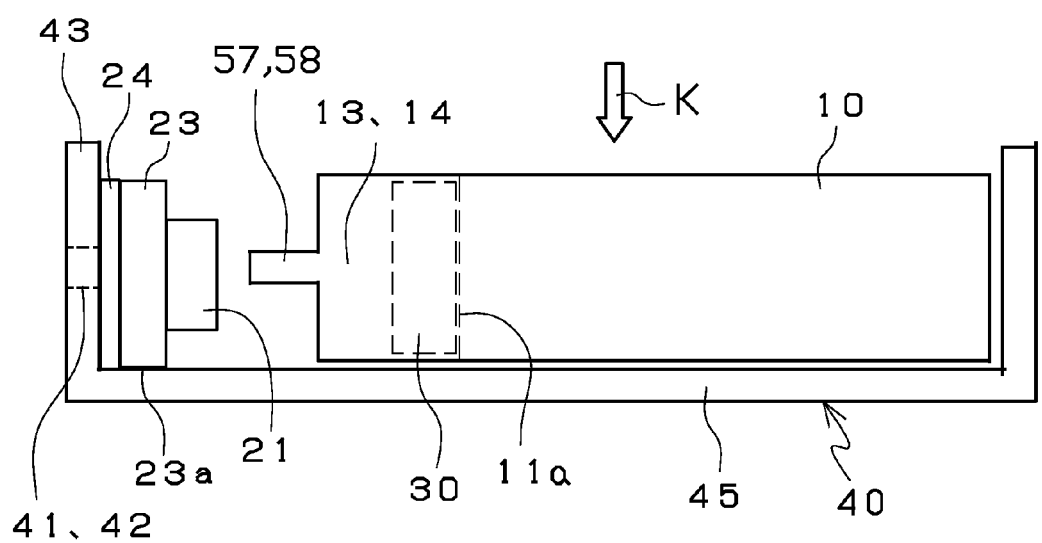
FIG. 18 is a cross-sectional view of the planar lighting unit according to the fourth embodiment of the present application, and illustrates a light guide plate installed in a rear frame in the assembly process.

First, as illustrated in FIG. 18, the elastomer 30 is affixed to the light entrance face 11a of the light guide plate 10, and the light guide plate 10 is placed on the bottom plate 45 of the rear frame 40 (as indicated by arrow K). At this time, the caulking members 57 and 58, which have not been subjected to the heated caulking treatment, protrude from the tips of the supports 13 and 14 on both sides of the light guide plate 10. Additionally, the caulking holes 41 and 42 are formed in the first side wall 43 of the rear frame 40 on extension lines of the caulking members 57 and 58.

Figure 19:
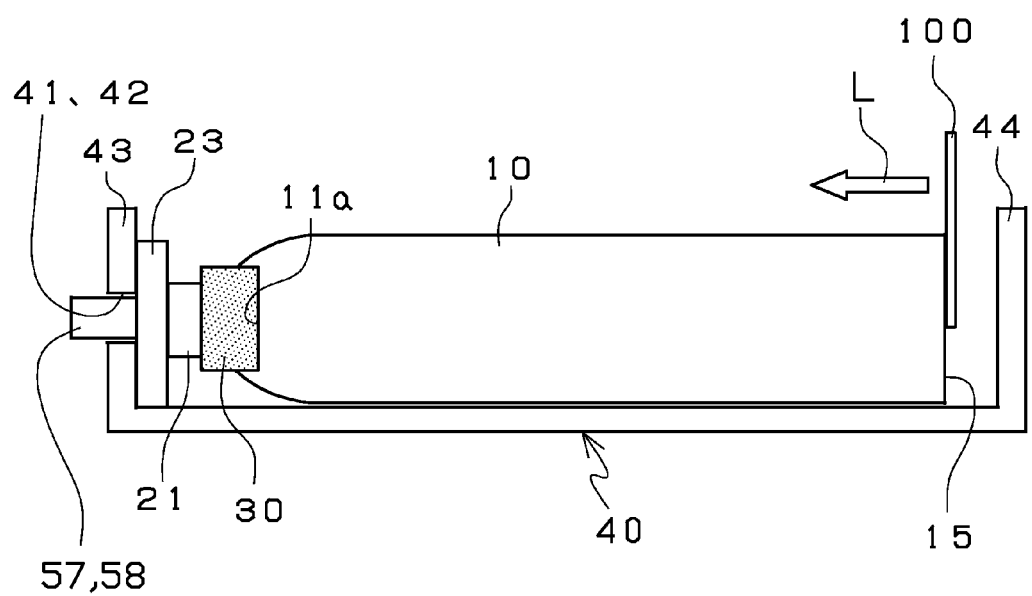
FIG. 19 is a cross-sectional view of the planar lighting unit according to the fourth embodiment of the present application, and illustrates a light guide plate 10 being pressed on using a pressing jig in the assembly process.

Next, as illustrated in FIG. 19, the pressing jig 100 is used to apply pressure in the direction of the arrow L to the back surface 15 side of the light guide plate 10 housed in the rear frame 40. Using this pressing jig 100, the light guide plate 10 is pressed until the supports 13 and 14 abut against the first side wall 43 of the rear frame 40.

At this time, the caulking members 57 and 58, which are disposed on the tips of the supports 13 and 14 of the light guide plate 10, are inserted from the inside into the caulking holes 41 and 42 formed in the first side wall 43 of the rear frame 40 such that the tips of the caulking members 57 and 58 protrude from the outside of the first side wall 43. Then, while pressing the light guide plate 10 with the pressing jig 100, the tips of the caulking members 57 and 58 protruding from the outside of the first side wall 43 are heated at a predetermined temperature using a heating jig (not illustrated). As a result, the tips of the caulking members 57 and 58 deform and widen, thus fixing the light guide plate 10 to the rear frame 40 (heated caulking treatment).

Figure 20:
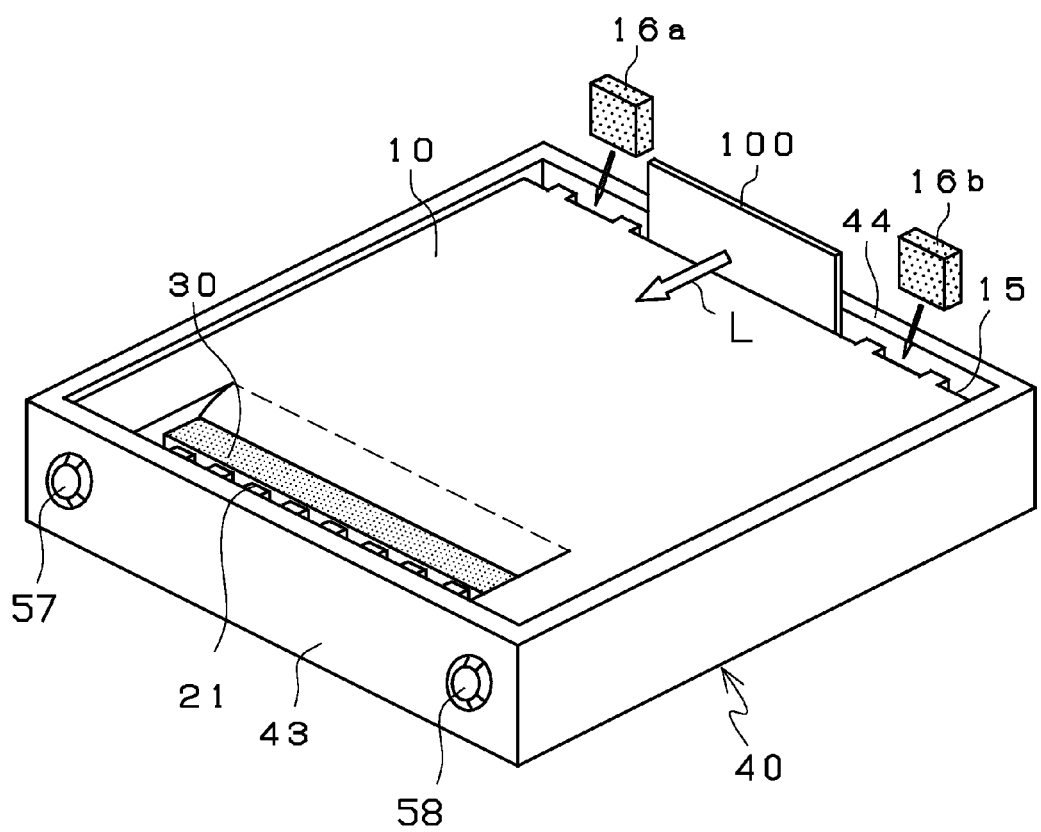
FIG. 20 is a perspective view of the planar lighting unit according to the fourth embodiment of the present application, and illustrates the assembly process.

Then, as illustrated in FIG. 20, the elastic members 16a and 16b are inserted in the gap between the back surface 15, which is on the side opposite the light entrance face 11a, of the light guide plate 10 and the second side wall 44 of the rear frame 40.

As described above, with the planar lighting unit 4, when housing the LEDs 21, the elastomer 30, and the light guide plate 10 in the rear frame 40, the light guide plate 10 and the rear frame are positioned simply by slightly moving the light guide plate 10 horizontally (in the direction parallel to the bottom plate 45 of the rear frame 40) and heat caulking the caulking members 57 and 58. As a result, the light guide plate 10 is reliably fixed to the rear frame 40. Therefore, even if an elastomer 30 having high flexibility is interposed between the LEDs 21 and the light guide plate 10, the position of the elastomer 30 before and after the heated caulking treatment will be extremely stable. This stability eliminates the need for adjusting to suppress positional deviation of the elastomer 30. Since adjustment work is unnecessary, ease of assembly improves.

Additionally, because the light guide plate 10 is fixed to the rear frame 40 by heated caulking, stable forces compress and deform the elastomer 30. As such, the LEDs 21 and the light entrance face 11a of the light guide plate 10 closely contact each other via the elastomer 30, and optical loss decreases. In other words, the configuration described above results in a planar lighting unit 4 with excellent luminous efficiency and uniform and stable light emitting performance. In the present embodiment, the caulking members 57 and 58 that fix the light guide plate 10 to the rear frame 40 are integrally molded with the light guide plate 10. As such, the manufacturing process is simplified and the number of parts is reduced.

Fifth Embodiment

Figure 21:
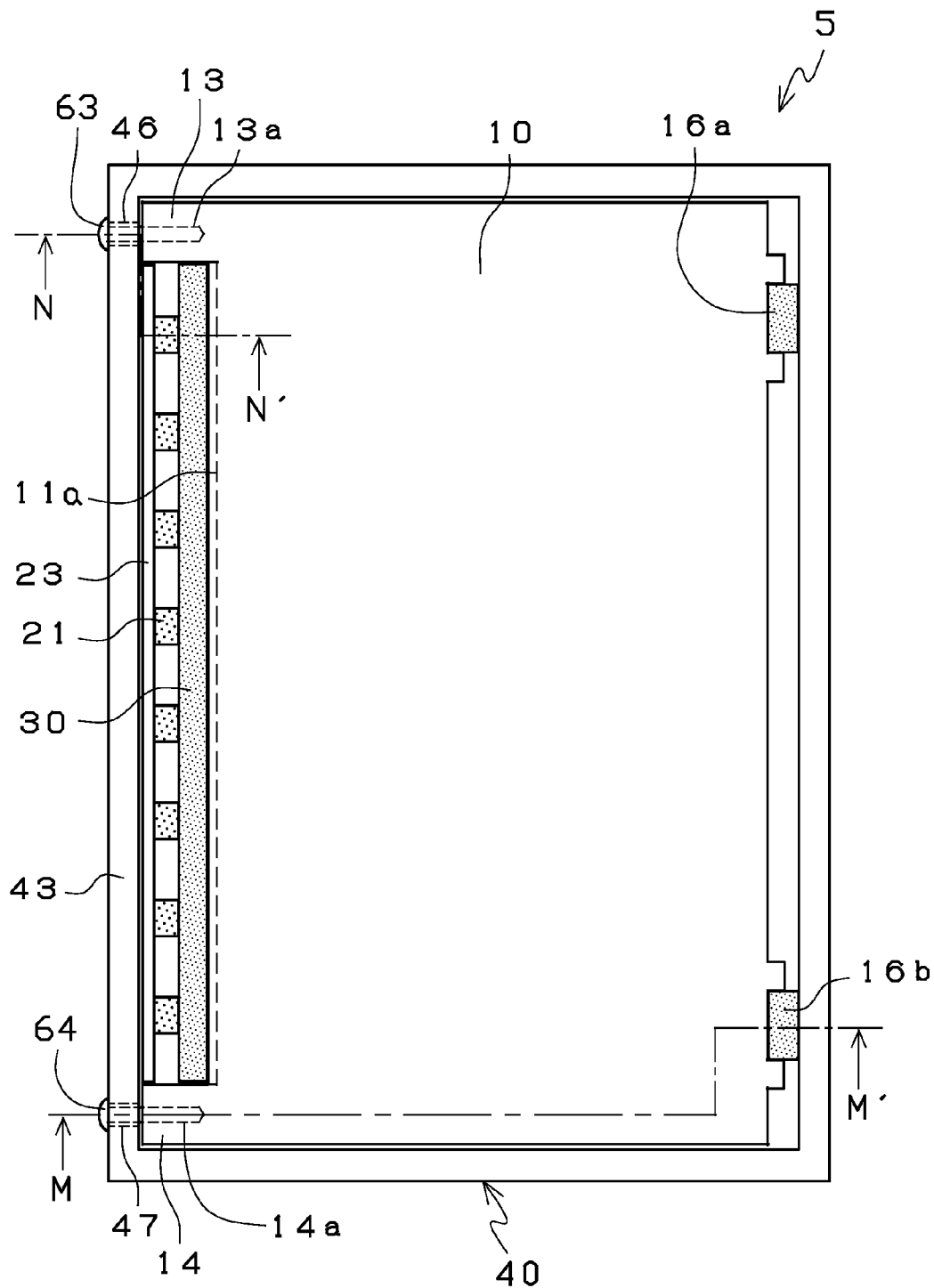
FIG. 21 is a plan view of a planar lighting unit according to a fifth embodiment of the present application.

A configuration of a planar lighting unit 5 according to a fifth embodiment of the present application will be described with reference to FIG. 21. Note that the planar lighting unit 5 differs from the planar lighting unit 1 according to the first embodiment only on the point of the means used to fix the light guide plate 10 to the rear frame 40. Accordingly, description will focus on the configuration differences. As illustrated in FIG. 21, the planar lighting unit 5 includes a light guide plate 10, a plurality of LEDs 21, a board 23, an elastomer 30, and a rear frame 40.

Supports 13 and 14 are respectively disposed on each side of the light entrance face 11a of the light guide plate 10. Screw holes 13a and 14a are respectively formed in the tips of the supports 13 and 14. Through-holes 46 and 47 are formed in the first side wall 43 of the rear frame 40 against which the supports 13 and 14 of the light guide plate 10 abut. The positions of the through-holes 46 and 47 respectively correspond to the screw holes 13a and 14a in the supports 13 and 14.

Screws 63 and 64 are respectively inserted into the through-holes 46 and 47 from outside the first side wall 43 of the rear frame 40, and screwed into the screw holes 13a and 14a in the supports 13 and 14 of the light guide plate 10.

Figure 22:
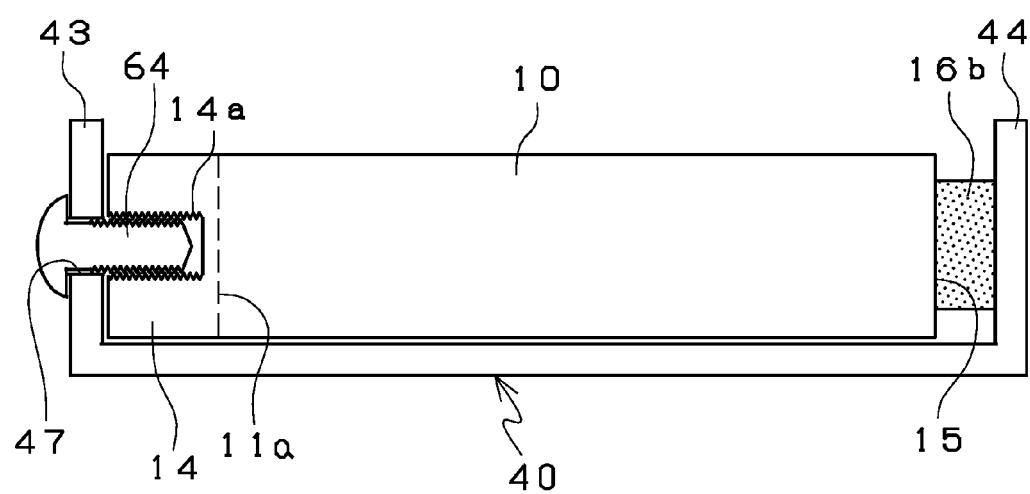
FIG. 22 is a cross-sectional view of the planar lighting unit illustrated in FIG. 21, taken along line M-M'.

Next, the fixed state of the light guide plate 10 to the rear frame 40 in the planar lighting unit 5 will be described with reference to FIG. 22. FIG. 22 is a cross-sectional view of the planar lighting unit 5, taken along line M-M' of FIG. 21. As illustrated in FIG. 22, the screw 64 on the support 14 side is inserted into the through-hole 47 in the first side wall 43 and is screwed into the screw hole 14a in the support 14. As a result, the light guide plate 10 is fixed to the rear frame 40. Likewise, the screw 63 on the support 13 side is screwed into the screw hole 13a and, as a result, the light guide plate 10 is fixed to the rear frame 40.

As described above, the light guide plate 10 is reliably fixed to the rear frame 40 by screwing the screws 63 and 64 into the supports 13 and 14. As with the planar lighting unit 1 according to the first embodiment, two elastic members 16a and 16b are inserted into the gap between the second side wall 44 of the rear frame 40 and the back surface 15, which is positioned on the side opposite the light entrance face 11a, of the light guide plate 10. The light guide plate 10 is supplementally supported by the elastic force exerted by the elastic members 16a and 16b.

Figure 23:
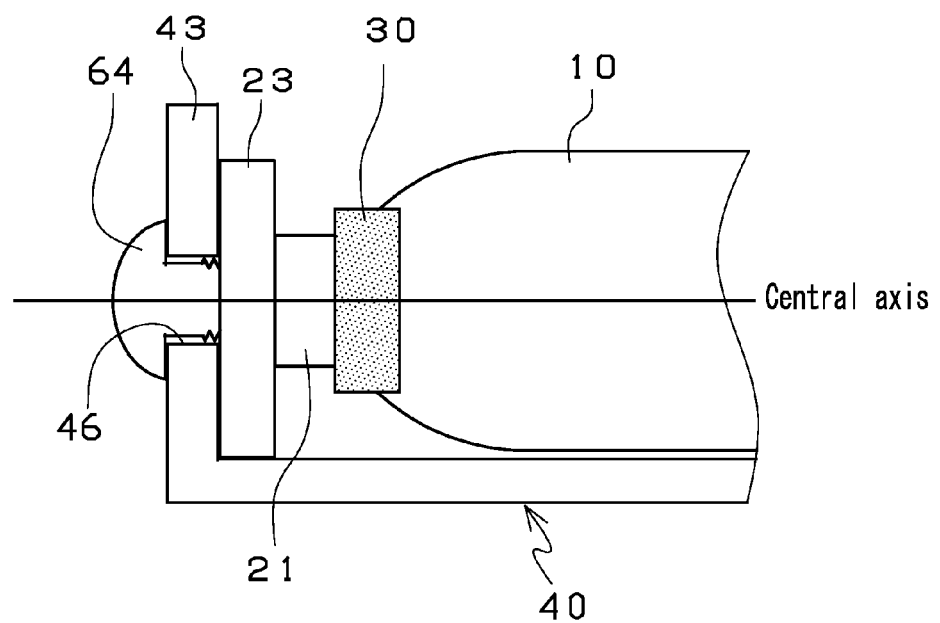
FIG. 23 is a cross-sectional view of the planar lighting unit illustrated in FIG. 21, taken along line N-N'.

Next, the positional relationship between the LEDs 21 and the light guide plate 10 of the planar lighting unit 5 will be described with reference to FIG. 23. FIG. 23 is a cross-sectional view of the planar lighting unit 5, taken along line N-N' of FIG. 21. As illustrated in FIG. 23, the central axis of the screw 63 screwed into the light guide plate 10, the central axis of the LED 21 mounted on the board 23, and the central axis of the light guide plate 10 coincide in the thickness direction. The same is true for the central axes on the screw 64 side.

Since the central axes of the three constituents coincide as described above, even if an elastomer 30 having high flexibility is interposed between the LEDs 21 and the light guide plate 10, the light guide plate 10 will be fixed to the rear frame 40 using the screws 63 and 64 without useless moments occurring. This is because only forces in the central axis direction will be exerted on the elastomer 30. In other words, with the planar lighting unit 5, the repulsive force exerted by the elastomer 30 will not cause the light guide plate 10 to tilt or move vertically with respect to the LEDs 21. As such, positional deviation between the LEDs 21 and the light guide plate 10 will not occur.

Figure 24:
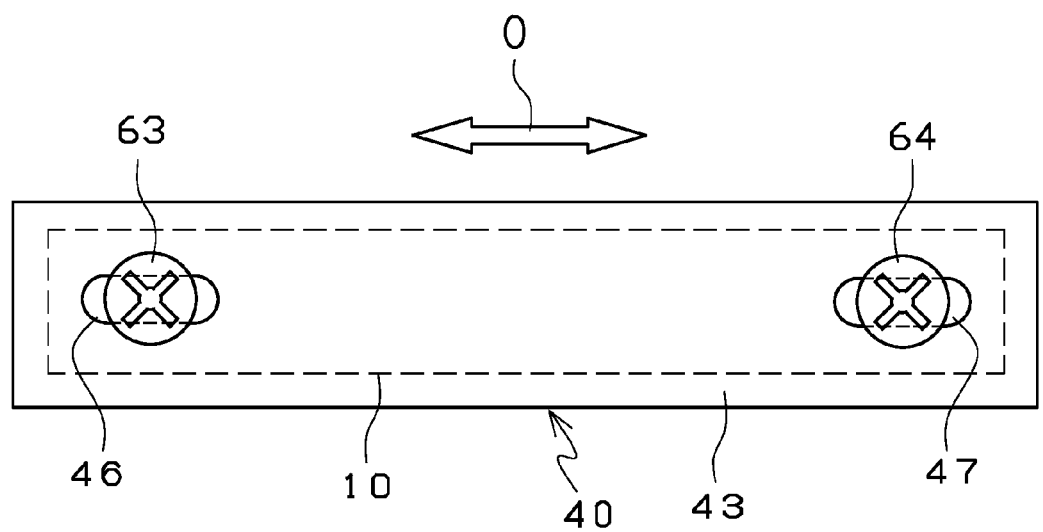
FIG. 24 is a left-side elevation view of the planar lighting unit illustrated in FIG. 21.

Next, the through-holes 46 and 47 of the planar lighting unit 5 will be described with reference to FIG. 24. FIG. 24 depicts the planar lighting unit 5 as seen from the first side wall 43 side. As illustrated in FIG. 24, the through-holes 46 and 47 are formed in the first side wall 43 of the rear frame 40. The screws 63 and 64 are inserted into these through-holes 46 and 47 to fix the light guide plate 10 (indicated by the dashed box). As illustrated, the through-holes 46 and 47 are respectively formed on the left and right sides of the first side wall 43. The through-holes 46 and 47 are horizontally elongated slots.

The light guide plate 10 thermally expands due to changes in temperature. As such, if the screws 63 and 64 having high rigidity are used to tightly fix the light guide plate 10 and restrict the thermal expansion of the light guide plate 10, the thermal expansion forces will cause the light guide plate 10 and the rear frame 40 to deform. This deformation may lead to positional deviation between the LEDs 21, the elastomer 30, and the light guide plate 10, reductions in luminous efficiency, and uneven brightness at the light exit face.

Therefore, with the planar lighting unit 5, the through-holes 46 and 47 in the first side wall 43 are formed as horizontal elongated slots. This configuration allows the screws 63 and 64 to slide longitudinally (in the direction of the arrow O) within the through-holes 46 and 47 when the light guide plate 10 expands. The forces due to thermal expansion of the light guide plate 10 are relaxed by the sliding of the screws 63 and 64, and positional deviation between the LEDs 21, the elastomer 30, and the light guide plate 10 is prevented. Note that resin washers (not illustrated) may be fitted on the screws 63 and 64 to facilitate the sliding of the screws 63 and 64 within the through-holes 46 and 47.

The assembly process of the planar lighting unit 5 differs from the assembly process of planar lighting unit 1 according to the first embodiment only on the point of the step of fixing the light guide plate 10 to the rear frame 40 using the screws 63 and 64. As such, only the step of fixing using the screws 63 and 64 will be described with reference to FIG. 20. In the following description, the caulking members 57 and 58 of FIG. 20 will be replaced with the screws 63 and 64. In FIG. 20, the light guide plate 10 housed in the rear frame 40 is pressed in the direction of the arrow L using the pressing jig 100. Then, while pressing the light guide plate 10, the screws 63 and 64 are respectively inserted into the through-holes 46 and 47 and screwed into the screw holes 13a and 14a in the supports 13 and 14 (see FIG. 21). Then, the elastic members 16a and 16b are inserted in the gap between the back surface 15, which is on the side opposite the light entrance face 11a, of the light guide plate 10 and the second side wall 44 of the rear frame 40.

As in described previously, with the planar lighting unit 5, the light guide plate 10 can be positioned and reliably fixed to the rear frame 40 by simple screwing work. As a result, assembly workability is facilitated. Due to the fact that the light guide plate 10 is reliably fixed to the rear frame 40, the planar lighting unit 5 exhibits excellent optical advantageous effects similar to the optical advantageous effects of the planar lighting unit 1. Additionally, due to the fact that the through-holes 46 and 47, into which the screws 63 and 64 are inserted, are formed as horizontally elongated slots, deformation of the light guide plate 10 caused by temperature change can be mitigated. Using the planar lighting unit 5 according to the fifth embodiment of the present application, large planar lighting units with large emission areas, high-brightness planar lighting units with high heat generation, and the like can be easily realized.

Sixth Embodiment

Figure 25:
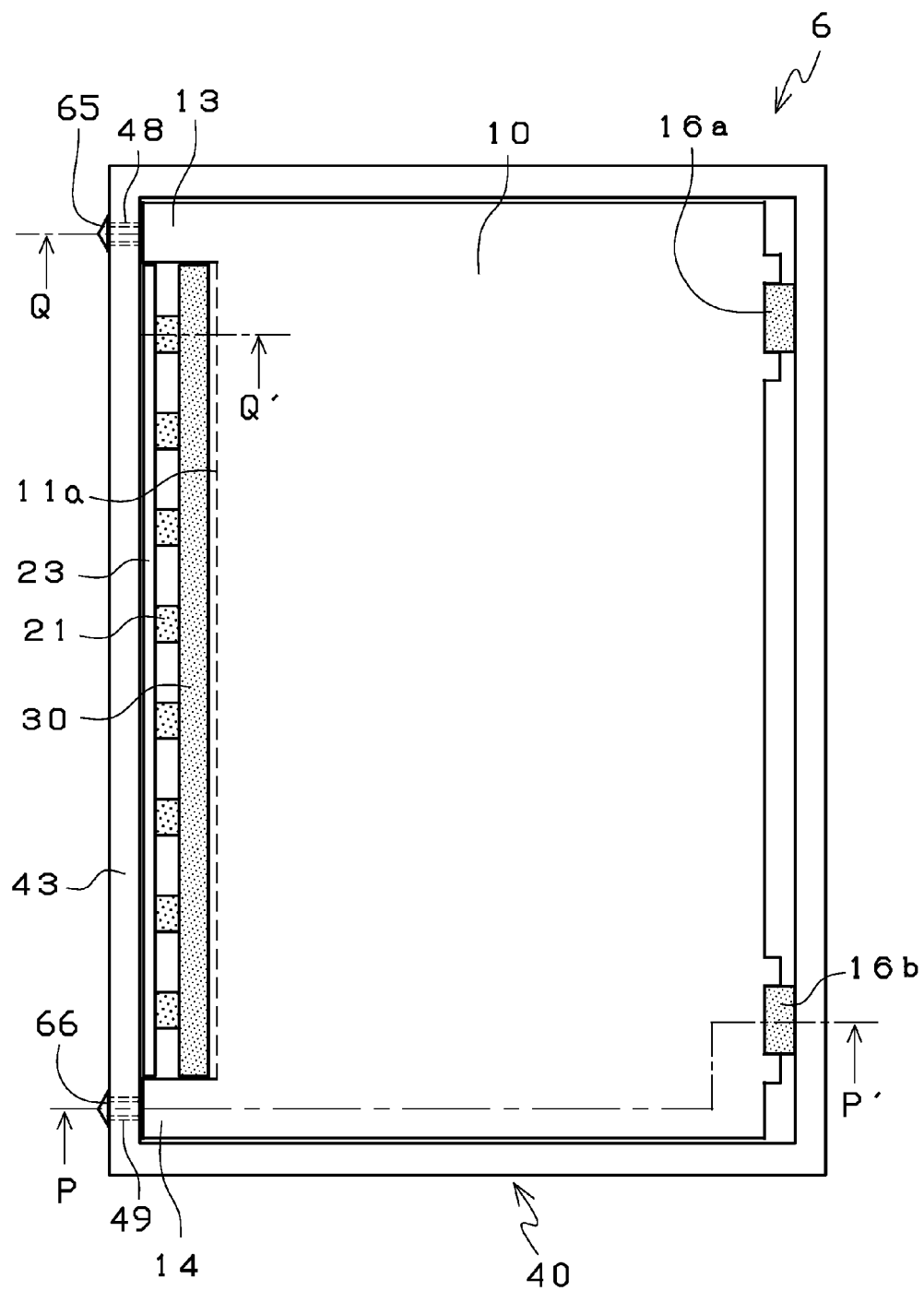
FIG. 25 is a plan view of a planar lighting unit according to a sixth embodiment of the present application.

A configuration of a planar lighting unit 6 according to a sixth embodiment of the present application will be described with reference to FIG. 25. Note that the planar lighting unit 6 differs from the planar lighting unit 1 according to the first embodiment only on the point of the means used to fix the light guide plate 10 to the rear frame 40. Accordingly, description will focus on the configuration differences. As illustrated in FIG. 25, the planar lighting unit 6 includes a light guide plate 10, a plurality of LEDs 21, a board 23, an elastomer 30, and a rear frame 40.

Supports 13 and 14 are respectively disposed on each side of the light entrance face 11a of the light guide plate 10. Hooks 65 and 66 are used as the fixing means and are respectively disposed on the tips of the supports 13 and 14. In the present embodiment, the tips of the hooks 65 and 66 are roughly conical. However, the shape of the hooks is not limited thereto and the hooks may, for example, be hook-shaped. Hook holes 48 and 49 are formed in the first side wall 43 of the rear frame 40 against which the supports 13 and 14 of the light guide plate 10 abut. These hook holes 48 and 49 are formed at positions corresponding to the hooks 65 and 66 of the supports 13 and 14.

Figure 26:
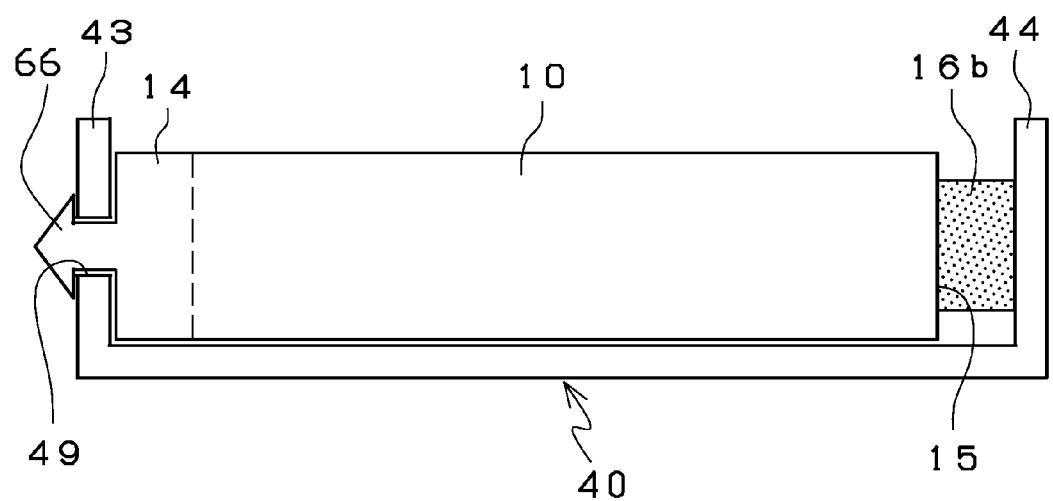
FIG. 26 is a cross-sectional view of the planar lighting unit illustrated in FIG. 25, taken along line P-P'.

Next, the fixed state of the light guide plate 10 to the rear frame 40 in the planar lighting unit 6 will be described with reference to FIG. 26. FIG. 26 is a cross-sectional view of the planar lighting unit 6, taken along line P-P' of FIG. 25. As illustrated in FIG. 26, the hook 66 of the support 14 is inserted from the inside into the hook hole 49 formed in the first side wall 43 of the rear frame 40 such that the tip of the hook 66 protrudes from the outside of the first side wall 43. Thus, the hook 66 is fitted into the hook hole 49. As a result, the light guide plate 10 is fixed to the rear frame 40. Likewise, the hook 65 of the support 13 is inserted from the inside into the hook hole 48 and, as a result, the light guide plate 10 is fixed to the rear frame 40.

The light guide plate 10 is reliably fixed to the rear frame 40 by the hooks 65 and 66 of the supports 13 and 14. As with the planar lighting unit 1 according to the first embodiment, two elastic members 16a and 16b are inserted into the gap between the second side wall 44 of the rear frame 40 and the back surface 15, which is positioned on the side opposite the light entrance face 11a, of the light guide plate 10. The light guide plate 10 is supplementally supported by the elastic force exerted by the elastic members 16a and 16b.

Figure 27:
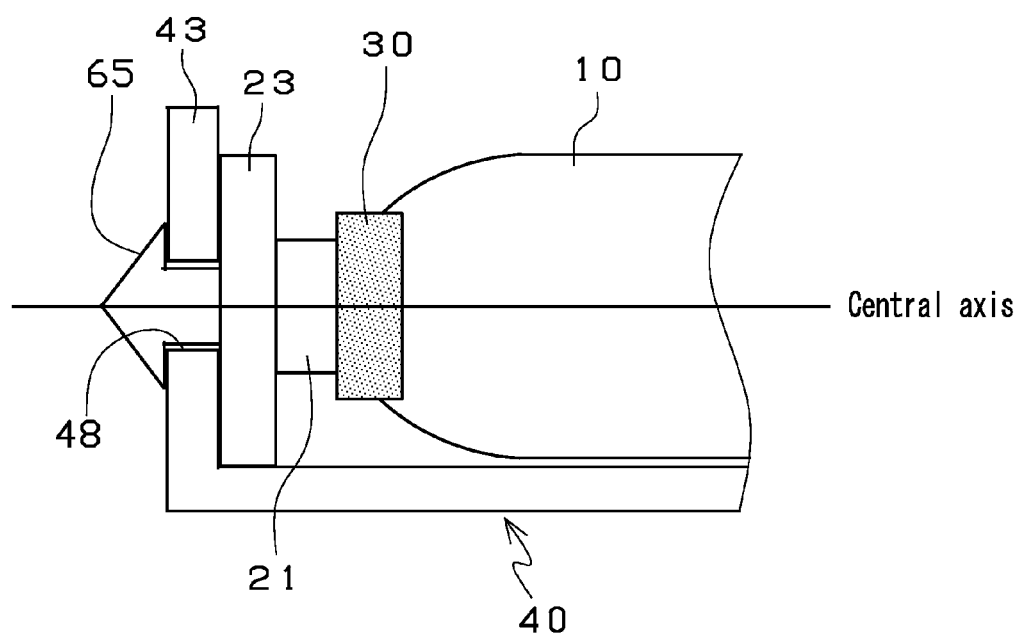
FIG. 27 is a cross-sectional view of the planar lighting unit illustrated in FIG. 25, taken along line Q-Q'.

Next, the positional relationship between the LEDs 21 and the light guide plate 10 of the planar lighting unit 6 will be described with reference to FIG. 27. FIG. 27 is a cross-sectional view of the planar lighting unit 6, taken along line Q-Q' of FIG. 25. As illustrated in FIG. 27, the central axis of the hook 65 fitted into the hook hole 48 in the first side wall 43, the central axis of the LED 21 mounted on the board 23, and the central axis of the light guide plate 10 coincide in the thickness direction. The same is true for the central axes on the hook 66 side.

As described previously, due to the fact that the central axes of these three constituents coincide, useless moments will not occur and only forces in the central axis direction will be exerted on the elastomer 30, even if an elastomer 30 having high flexibility is interposed between the LEDs 21 and the light guide plate 10. As such, the light guide plate 10 will not tilt or move vertically with respect to the LEDs 21 and positional deviation between the LEDs 21 and the light guide plate 10 will not occur.

The assembly process of the planar lighting unit 6 differs from the assembly process of planar lighting unit 1 according to the first embodiment only on the point of the step of fixing the light guide plate 10 to the rear frame 40 using the hooks 65 and 66. As such, only the step of fixing using the hooks 65 and 66 will be described with reference to FIG. 20. In the following description, the caulking members 57 and 58 of FIG. 20 will be replaced with the hooks 65 and 66. As illustrated in FIG. 20, the light guide plate 10 housed in the rear frame 40 is pressed in the direction of the arrow L using the pressing jig 100. This pressing results in the hooks 65 and 66 being inserted into the hook holes 48 and 49 (see FIG. 25) in the first side wall 43 and the light guide plate 10 being fixed to the rear frame 40. Then, the elastic members 16a and 16b are inserted in the gap between the back surface 15, which is on the side opposite the light entrance face 11a, of the light guide plate 10 and the second side wall 44 of the rear frame 40.

As described previously, with the planar lighting unit 6, the light guide plate 10 is reliably fixed to the rear frame 40 simply by the work of inserting the hooks 65 and 66. As such, assembly workability is facilitated. Due to the fact that the light guide plate 10 is positioned and reliably fixed to the rear frame 40, the planar lighting unit 6 exhibits excellent optical advantageous effects similar to the optical advantageous effects of the planar lighting unit 1. While not illustrated in the drawings, it is possible to elongate the hook holes 48 and 49 to prevent deformation of the light guide plate 10 due to temperature changes. As such, advantageous effects similar to the advantageous effects obtained from the planar lighting unit 5 can be obtained.

Seventh Embodiment

Figure 28:
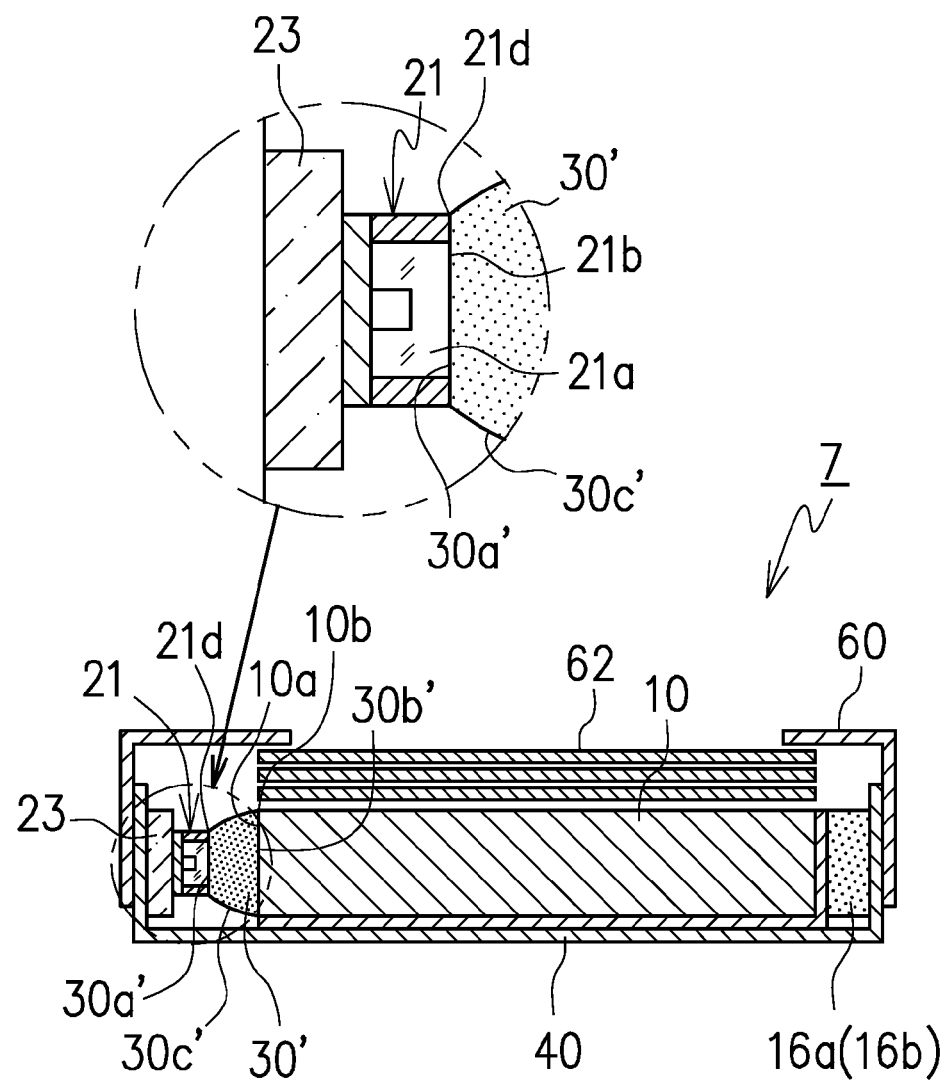
FIG. 28 is a cross-sectional view of a planar lighting unit according to a seventh embodiment of the present application.

FIG. 28 depicts a planar lighting unit 7 according to a seventh embodiment of the present application. Note that the planar lighting unit 7 differs from the planar lighting unit 1 according to the first embodiment only on the point of the configuration of the transparent flexible resin, namely the elastomer, interposed between the LEDs and the light guide plate. Accordingly, description will focus on the configuration differences. As illustrated in FIG. 28, the planar lighting unit 7 includes a light guide plate 10, a plurality of LEDs 21, a board 23 on which the plurality of LEDs 21 are mounted, an elastomer 30' between the LEDs 21 and the light guide plate 10, and a rear frame 40 that houses the light guide plate 10, the LEDs 21, the board 23, and the elastomer 30'.

The elastomer 30' has flexibility such that the compressive stress of the elastomer 30', when compressed between the LEDs 21 and the light guide plate 10 to roughly half-thickness, is 1 to 2 MPa or less. This configuration ensures that the LEDs 21 will not be destroyed by the compressive force. For example, in the present embodiment, the flexibility is set so that the Young's modulus of the elastomer 30' is approximately 0.1 to 1 MPa.

Furthermore, the elastomer 30' includes a first contact surface 30a' and a second contact surface 30b'. The first contact surface 30a' closely contacts the edge face of the fluorescent resin 21a that forms the emission surface 21b of each of the LEDs 21. The second contact surface 30b' closely contacts the light entrance face 10a of the light guide plate 10. The first contact surface 30a' is formed so as to closely contact an entirety of the height direction (the vertical direction in FIG. 28) of the emission surface 21b of each of the LEDs 21. The second contact surface 30b' is formed so as to closely contact an entirety of the height direction (the vertical direction in FIG. 28) of the light entrance face 10a of the light guide plate 10. The vertical dimension of the second contact surface 30b' is greater than the vertical dimension of the first contact surface 30a'. Additionally, the elastomer 30' includes a reflective curved surface 30c'. In a cross-section of the planar lighting unit 7, a curved portion of the reflective curved surface 30c' has an outward-bulging two-dimensional curve such as an ellipse, hyperbola, or parabola. In a cross-section of the planar lighting unit 7, the reflective curved surface 30c' forms a curve extending from each edge portion 21d of the emission surface 21b of each of the LEDs 21 toward a corresponding edge portion 10b of the light entrance face 10a of the light guide plate 10.

Figure 29A:
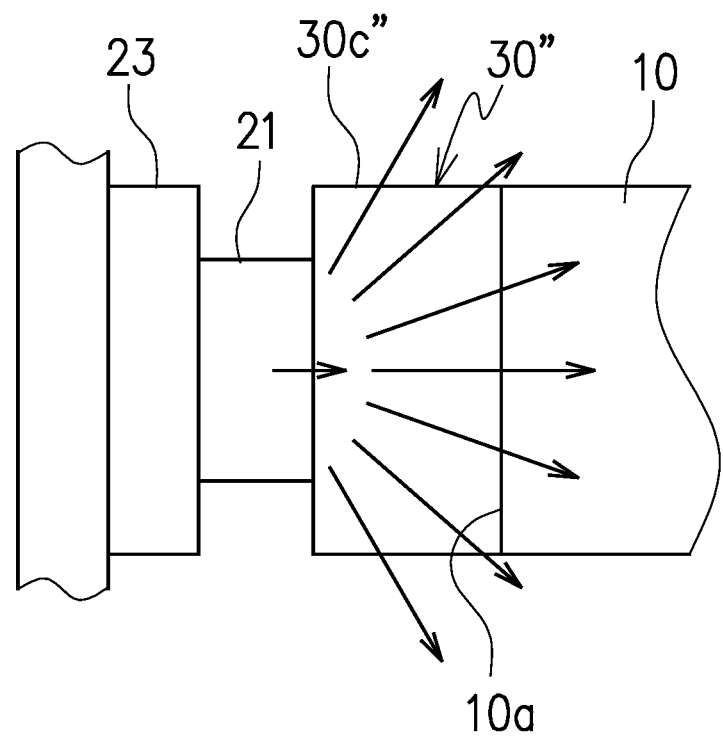
FIG. 29A is a cross-sectional view of a close contact portion of a transparent flexible resin and a light emitting diode, and illustrates a case where the rectangular cross-sectional shape of the transparent flexible resin is rectangular.
Figure 29B:
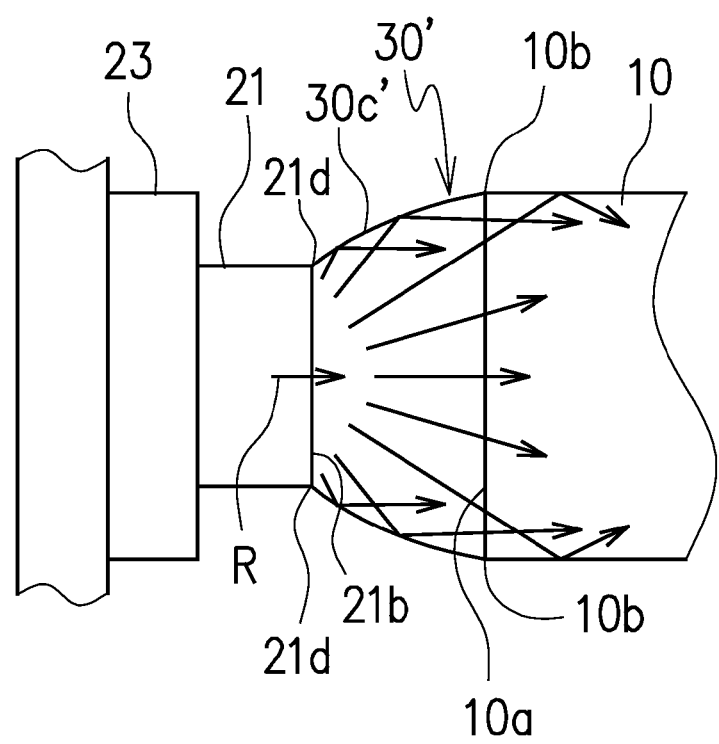
FIG. 29B is a cross-sectional view of the close contact portion of the transparent flexible resin and the light emitting diode illustrated in FIG. 28.

As illustrated in FIG. 29B, a portion of the light travels outward within the elastomer 30'. The reflective curved surface 30c' reflects this light toward the light entrance face 10a of the light guide plate 10. That is, when using an elastomer 30'' having an exclusively rectangular cross-section similar to the cross-section of the light entrance face 10a of the light guide plate 10 illustrated in FIG. 29A, a portion of the light emitted from the LEDs 21 enters the elastomer 30'' and travels toward side surfaces 30c'' of the elastomer 30'' near the LEDs 21. However, in this case, this light does not reflect at the side surfaces 30c'' and, instead, passes through the side surfaces 30c'' and out of the elastomer 30''. In contrast, as illustrated in FIG. 29B, the side surfaces of the elastomer 30' of the present embodiment are formed from the reflective curved surface 30c' and, as described above, each reflective curved surface 30c' has an outward-bulging two-dimensional curve. As such, when light emitted from the LEDs 21 strikes the reflective curved surface 30c' near the LEDs 21 at a large angle of incidence, most of the light totally reflects and is directed toward the light entrance face 10a of the light guide plate 10. As a result, luminous efficiency is improved.

The curved cross-sectional shape of the reflective curved surface 30c' is determined as follows: With the center (in FIG. 29B, the point where the emission surface 21b and the arrow R intersect) of the emission surface 21b of the LED 21 as the origin, divide the range from the edge portion 10b of the light entrance face 10a of the light guide plate 10 to the edge portion 21d of the emission surface 21b of the LED 21 at a small angle ΔR. Next, set a line segment in one small angle region ΔRn where the angle of incidence of the light ray originating from the origin exceeds the critical angle. After setting a line segment for each n, move these line segments in parallel in each region ΔRn so as to connect the line segments from the edge portion 10b of the light entrance face 10a of the light guide plate 10 to the edge portion 21d of the emission surface 21b of the LED 21. Approximate the resulting polygonal line using a quadratic function to obtain an optimal curve.

Figure 30:
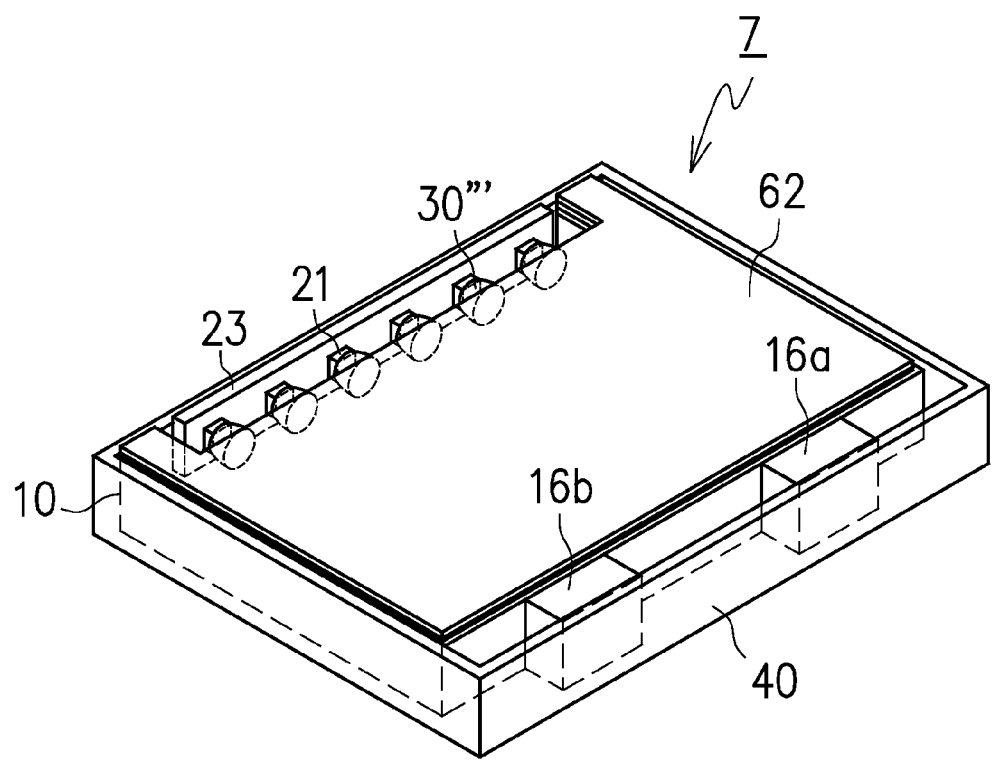
FIG. 30 illustrates a modification of the transparent flexible resin.

With the planar lighting unit 7, the single elongated elastomer 30' is brought into close contact with the plurality of LEDs 21. However, as illustrated in FIG. 30, an individual elastomer 30''' having a bowl shape may be brought into close contact with each of the LEDs 21.

Figure 31:
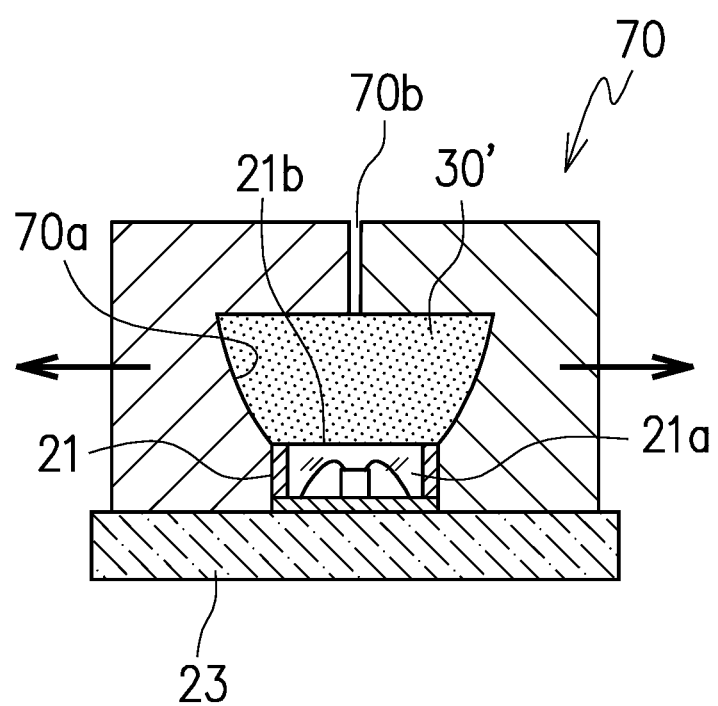
FIG. 31 is a main constituent cross-sectional view of a mold for molding the transparent flexible resin.

Next, a process of forming the elastomer 30' of the planar lighting unit 7 will be described. The elastomer 30' is adhered to the LEDs 21 when forming the elastomer 30'. As a result, the LEDs 21 and the elastomer 30' are integrated. As illustrated in FIG. 31, a mold 70 is used to form the elastomer 30'. The mold 70 is closed from opposing sides of the LEDs 21 mounted on the board 23. When the mold 70 is closed, a flexible resin molding portion 70a is formed above the edge surface of the fluorescent resin 21a. After the molding, this edge surface becomes the emission surface 21b of the LED 21. The flexible resin molding portion 70a is a cavity. A cross-section of this cavity widens upward in a rough bowl shape.

After closing the mold 70 from both sides of the LEDs 21 as described above, resin is injected into the flexible resin molding portion 70a through an injection port 70b formed in the top surface of the mold 70. Then, the mold 70 is opened from both sides (in the directions of the arrows in FIG. 31)

of the LEDs 21, and the elastomer 30' and the LEDs 21 are removed from the mold 70. As a result, the elastomer 30' is integrally formed in a state of close contact with the LEDs 21.

With this manufacturing method, it is possible to easily mold shapes having a greater width at the top edge than the width at the bottom edge, such as the elastomer 30' of the present embodiment. Moreover, in terms of precision and ease of assembly, the manufacturing method described above in which the elastomer 30' is molded while integrated with the LEDs 21 is advantageous over manufacturing methods in which the elastomer is formed and then brought into close contact with the LEDs 21.

Figure 32A:
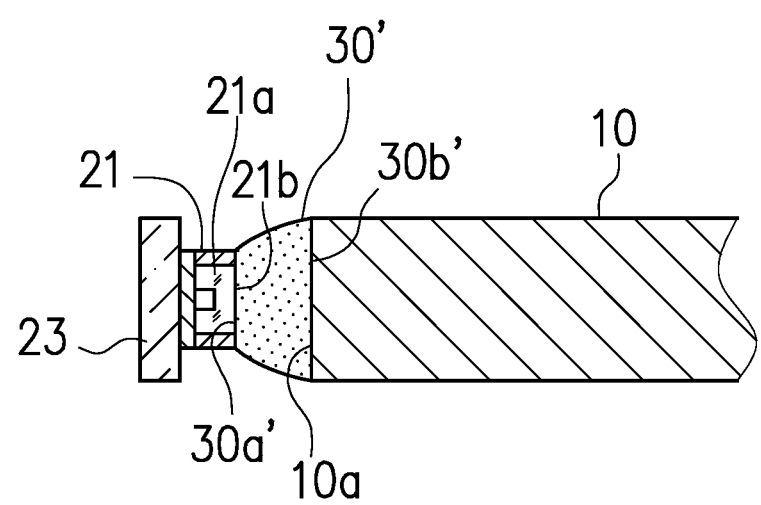
FIG. 32A is a cross-sectional view of the close contact portion of the transparent flexible resin and the light guide plate illustrated in FIG. 28.

As illustrated in FIG. 32A, the light entrance face 10a of the light guide plate 10 is a flat surface parallel with the edge faces of the fluorescent resin 21a that becomes the emission surfaces 21b of the LEDs 21. The first contact surface 30a' that closely contacts the edge face of the fluorescent resin 21a and the second contact surface 30b' that closely contacts the light entrance face 10a of the light guide plate 10 are also flat and parallel surfaces. This configuration facilitates the molding of each surface, the ensuring of adhesion, and manufacturing.

Figure 32B:
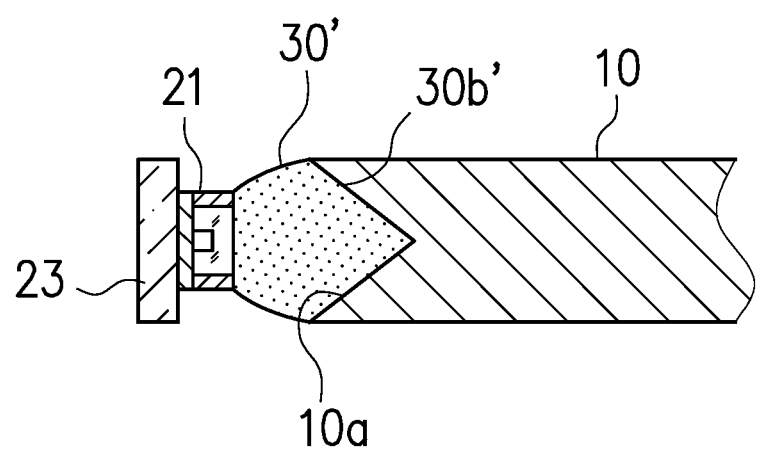
FIG. 32B is a cross-sectional view of a modification of the close contact portion of the transparent flexible resin and the light guide plate.

As illustrated in FIG. 32B, a configuration is possible in which the light entrance face 10a of the light guide plate 10 is a roughly V-shaped concave surface extending from the outer edges toward the center of the light guide plate 10. In this case, the second contact surface 30b' that closely contacts this recessed surface is a roughly V-shaped convex surface extending from the outer edges toward the center of the light guide plate 10. In this case, the second contact surface 30b' of the elastomer 30' is fitted to the light entrance face 10a of the light guide plate 10. This configuration facilitates the alignment of the central axes (optical axes) of the LEDs 21, the elastomer 30', and the light guide plate 10.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A side edge planar lighting unit comprising:
   a light emitting diode;
   a light guide plate; and
   a transparent flexible resin between the light emitting diode and a light entrance face of the light guide plate, the light emitting diode and the light entrance face of the light guide plate being in close contact with the transparent flexible resin,
   wherein the light guide plate comprises a light exit face on a first main surface, a reflective face positioned on a side opposite the light exit face, and a recessed portion in a first side edge;
   wherein the recessed portion comprises the light entrance face on a bottom surface, a pair of light entrance side faces facing each other across the light entrance face, and an anti-slip portion comprising an uneven structure on at least one of the light entrance side faces, and
   wherein the transparent flexible resin is fitted into the recessed portion of the light guide plate.

2. The side edge planar lighting unit according to claim 1, wherein the anti-slip portion comprising the uneven structure comprises a ridge line along a fitting direction of the transparent flexible resin.

3. The side edge planar lighting unit according to claim 1, wherein the anti-slip portion comprising the uneven structure comprises a ridge line in a direction orthogonal to a fitting direction of the transparent flexible resin.

4. The side edge planar lighting unit according to claim 1, wherein the anti-slip portion comprising the uneven structure comprises a plurality of dots.

5. The side edge planar lighting unit according to claim 1,
   wherein a cross-sectional shape of the recessed portion gradually widens from the bottom surface toward a top edge of the recessed portion, and
   wherein a distance between the pair of light entrance side faces facing each other is greater at the top edge of the recessed portion than at the bottom surface of the recessed portion.

6. The side edge planar lighting unit according to claim 1,
   wherein the light guide plate comprises a back surface on a side opposite the light entrance face, and
   wherein an elastic member is disposed in a gap between the back surface and a side wall of a case housing the light guide plate.

7. The side edge planar lighting unit according to claim 6, further comprising a protrusion on the back surface of the light guide plate, the protrusion being configured to hold the elastic member.

8. The side edge planar lighting unit according to claim 1, wherein the light guide plate comprises a reflective curved surface extending from the first side edge toward the light exit face of the light guide plate.

9. The side edge planar lighting unit according to claim 1, wherein the transparent flexible resin comprises a reflective curved surface extending from the light emitting diode toward the light entrance face of the light guide plate.

10. The side edge planar lighting unit according to claim 1, wherein the light guide plate comprises
    a pair of supports, one of the pair of supports being provided on each side of the first side edge, and
    a fixing member fixing the light guide plate in a case in which the light guide plate is housed, disposed on a tip of each of the pair of supports.

11. The side edge planar lighting unit according to claim 10, wherein the fixing member is at least one of a caulking member, a screw, and a hook disposed on the tip of each of the pair of supports.

12. The side edge planar lighting unit according to claim 10, wherein a central axis of the fixing member, a central axis of the light emitting diode, and a central axis of the light guide plate coincide in a thickness direction of the light guide plate.

13. The side edge planar lighting unit according to claim 11, wherein a central axis of the fixing member, a central axis of the light emitting diode, and a central axis of the light guide plate coincide in a thickness direction of the light guide plate.

* * * * *